(12) United States Patent
Sandberg et al.

(10) Patent No.: US 11,687,868 B2
(45) Date of Patent: Jun. 27, 2023

(54) DELIVERING INTERNATIONAL SHIPPED ITEMS

(71) Applicant: KLEAREXPRESS CORPORATION, San Jose, CA (US)

(72) Inventors: Ulf Sandberg, San Jose, CA (US); Rick Tellez, San Jose, CA (US); Sam Tyagi, San Jose, CA (US)

(73) Assignee: KlearNow Corporation, Santa Clara, CA (US)

( * ) Notice: Subject to any disclaimer, the term of this patent is extended or adjusted under 35 U.S.C. 154(b) by 1036 days.

(21) Appl. No.: 16/166,859

(22) Filed: Oct. 22, 2018

(65) Prior Publication Data
US 2019/0122171 A1 Apr. 25, 2019

Related U.S. Application Data

(60) Provisional application No. 62/577,104, filed on Oct. 25, 2017.

(51) Int. Cl.
G06Q 10/0831 (2023.01)
G06Q 20/10 (2012.01)
(Continued)

(52) U.S. Cl.
CPC ... *G06Q 10/0831* (2013.01); *G06Q 10/08345* (2013.01); *G06Q 20/102* (2013.01); *G06Q 40/02* (2013.01)

(58) Field of Classification Search
CPC combination set(s) only.
See application file for complete search history.

(56) References Cited

U.S. PATENT DOCUMENTS 5,968,110 A * 10/1999 Westrope ............... H04M 3/493
                                                        705/26.81
6,463,421 B2 * 10/2002 Junger .................... G07F 7/06
                                                        705/28
(Continued)

FOREIGN PATENT DOCUMENTS

CN    108363943 B  * 12/2020   ......... G06K 9/00456
JP    2016194760 A * 11/2016
(Continued)

OTHER PUBLICATIONS

Postnord, published by postnord.se on Jan. 11, 2017 (Year: 2017).*
(Continued)

*Primary Examiner* — Omar Zeroual
(74) *Attorney, Agent, or Firm* — Stevens Law Group; David R. Stevens

(57) ABSTRACT

The present invention extends to methods, systems, and computer program products for delivering internationally shipped items. Aspects of the invention utilize a unifying database to consolidate information from different parties (e.g., government entities, shippers, carriers, and item recipients) associated with delivery of an internationally shipped item in a common location. The unifying database facilitates communication between different the parties that use different data protocols, different data formats, different data types, different EDI, etc., including direct database entry of some data. Parties can update relevant information corresponding to their responsibilities within the unified database. When one party updates information, other parties can be notified electronically in essentially real time of status changes relevant to item delivery.

7 Claims, 12 Drawing Sheets

(51) Int. Cl.
*G06Q 10/0834* (2023.01)
*G06Q 40/02* (2023.01)

(56) References Cited

U.S. PATENT DOCUMENTS

| | | | | |
|---|---|---|---|---|
| 7,058,581 | B1* | 6/2006 | Young | G07F 17/0042 705/16 |
| 7,177,825 | B1 | 2/2007 | Borders et al. | |
| 7,389,286 | B2* | 6/2008 | Holmes | G06Q 10/10 |
| 7,455,226 | B1* | 11/2008 | Hammond | G06Q 20/202 705/28 |
| 7,464,054 | B2* | 12/2008 | Chin | G06Q 40/03 705/37 |
| 7,596,500 | B1* | 9/2009 | Thompson | G06Q 30/0284 705/417 |
| 7,660,006 | B2* | 2/2010 | Taskett | G06Q 10/08 358/1.15 |
| 7,730,039 | B2* | 6/2010 | Holmes | G06Q 30/04 707/690 |
| 7,792,863 | B2* | 9/2010 | Uy | G06Q 20/102 707/793 |
| 8,046,273 | B2* | 10/2011 | Welter | G06Q 10/087 705/28 |
| 8,156,007 | B1* | 4/2012 | Anthony | G06Q 99/00 705/26.1 |
| 9,033,230 | B2* | 5/2015 | Combs | G06Q 30/016 235/375 |
| 9,984,351 | B1* | 5/2018 | Antony | G06Q 10/087 |
| 10,395,078 | B1* | 8/2019 | Abebe | B65D 25/205 |
| 10,410,165 | B2* | 9/2019 | Tibbs | G06Q 10/0837 |
| 10,579,955 | B1* | 3/2020 | Wier | G06Q 10/0838 |
| 10,769,585 | B2* | 9/2020 | Campbell | G06Q 10/087 |
| 10,896,399 | B2* | 1/2021 | Bramble | G06Q 10/0831 |
| 10,963,831 | B2* | 3/2021 | Snyder | G06Q 10/10 |
| 11,010,706 | B1* | 5/2021 | Wier | G06Q 10/0837 |
| 11,107,029 | B1* | 8/2021 | Henry | H04L 67/34 |
| 2002/0010689 | A1* | 1/2002 | Tibbs | G06Q 10/08 705/408 |
| 2002/0013721 | A1* | 1/2002 | Dabbiere | G06Q 10/103 705/1.1 |
| 2002/0019785 | A1* | 2/2002 | Whitman | G06Q 30/06 705/28 |
| 2002/0023024 | A1* | 2/2002 | Kaimowitz | G06Q 30/0641 705/26.35 |
| 2002/0032612 | A1* | 3/2002 | Williams | G06Q 10/083 705/26.1 |
| 2002/0069095 | A1* | 6/2002 | Nishio | G06Q 10/087 705/28 |
| 2002/0091574 | A1* | 7/2002 | Lefebvre | G06Q 40/12 705/30 |
| 2002/0120475 | A1* | 8/2002 | Morimoto | B65D 23/14 705/4 |
| 2002/0120527 | A1* | 8/2002 | Lam | G06Q 30/06 705/26.61 |
| 2002/0123911 | A1* | 9/2002 | Bjerre | G06Q 10/0834 705/5 |
| 2002/0152093 | A1* | 10/2002 | Chalmers | G06Q 30/02 705/28 |
| 2002/0152174 | A1* | 10/2002 | Woods | G06Q 30/04 705/61 |
| 2003/0040947 | A1* | 2/2003 | Alie | G06Q 10/087 705/28 |
| 2003/0065725 | A1* | 4/2003 | Delmer | H04L 63/0263 709/206 |
| 2003/0065726 | A1* | 4/2003 | Wells | H04L 63/029 709/206 |
| 2003/0093358 | A1* | 5/2003 | Liao | G06Q 40/04 705/37 |
| 2003/0135432 | A1* | 7/2003 | McIntyre | G06Q 10/087 705/28 |
| 2003/0144971 | A1* | 7/2003 | Das | G06Q 20/10 705/401 |
| 2003/0195778 | A1* | 10/2003 | Smith | G06Q 10/087 705/28 |
| 2003/0195784 | A1* | 10/2003 | Smith, Jr. | G06Q 10/087 705/28 |
| 2003/0195843 | A1* | 10/2003 | Matsuda | G06Q 30/06 705/26.1 |
| 2003/0217017 | A1* | 11/2003 | Willoughby | G09F 3/0288 705/404 |
| 2003/0220855 | A1* | 11/2003 | Lam | G06Q 30/04 705/34 |
| 2003/0225625 | A1* | 12/2003 | Chew | G06Q 20/209 705/24 |
| 2004/0083233 | A1* | 4/2004 | Willoughby | G06Q 10/087 |
| 2004/0122690 | A1* | 6/2004 | Willoughby | G06Q 10/083 705/337 |
| 2004/0148052 | A1* | 7/2004 | Ferguson | G06Q 10/08 700/213 |
| 2004/0172260 | A1* | 9/2004 | Junger | G06Q 10/0834 705/333 |
| 2004/0193438 | A1* | 9/2004 | Stashluk, Jr. | G06Q 30/02 705/304 |
| 2004/0194056 | A1* | 9/2004 | Combs | G06Q 30/016 717/104 |
| 2004/0212833 | A1* | 10/2004 | Taskett | G06Q 10/08 358/1.18 |
| 2004/0215531 | A1* | 10/2004 | Stashluk, Jr. | G06Q 10/087 705/28 |
| 2004/0225624 | A1* | 11/2004 | Reynolds | G06Q 20/204 705/401 |
| 2004/0243484 | A1* | 12/2004 | Smith | G06Q 10/10 705/26.1 |
| 2004/0243690 | A1* | 12/2004 | Hancock | G06Q 10/087 709/219 |
| 2004/0267642 | A1* | 12/2004 | Stenz | G06Q 30/04 705/28 |
| 2005/0004894 | A1* | 1/2005 | Uy | G06Q 10/0831 |
| 2005/0060165 | A1* | 3/2005 | Knight | G06Q 10/08 705/333 |
| 2005/0114219 | A1* | 5/2005 | Sultan | G06Q 30/0206 705/26.1 |
| 2005/0114221 | A1* | 5/2005 | Walters | G06Q 10/08 705/1.1 |
| 2005/0144059 | A1* | 6/2005 | Schuessler | G06Q 10/08 705/333 |
| 2005/0149453 | A1* | 7/2005 | Amling | G06Q 10/0833 705/60 |
| 2005/0192816 | A1* | 9/2005 | Wechsel | G06Q 10/087 705/28 |
| 2005/0222853 | A1* | 10/2005 | Black | G06Q 30/0283 705/331 |
| 2005/0222911 | A1* | 10/2005 | Kerker | G06Q 30/02 705/26.1 |
| 2005/0228681 | A1* | 10/2005 | McMahon | G06Q 10/08 705/333 |
| 2006/0036504 | A1* | 2/2006 | Allocca | G06Q 30/06 705/26.1 |
| 2006/0149577 | A1* | 7/2006 | Stashluk | G06Q 30/016 705/13 |
| 2006/0282271 | A1* | 12/2006 | Ananda | G06Q 10/08 705/26.1 |
| 2006/0293911 | A1* | 12/2006 | Wittmann | G06Q 20/102 705/40 |
| 2007/0005452 | A1* | 1/2007 | Klingenberg | G06Q 50/32 705/334 |
| 2007/0055639 | A1* | 3/2007 | Garvey | B42D 15/006 705/410 |
| 2007/0073551 | A1* | 3/2007 | Williams | G06Q 10/101 705/26.1 |
| 2007/0295799 | A1* | 12/2007 | Chibel | G06Q 10/08 235/375 |
| 2007/0299751 | A1* | 12/2007 | Jenkins | G06Q 40/123 705/31 |
| 2007/0299791 | A1* | 12/2007 | Mack | G06Q 10/0837 705/402 |
| 2008/0004995 | A1* | 1/2008 | Klingenberg | G06Q 10/0832 705/28 |

(56) References Cited

U.S. PATENT DOCUMENTS

| | | | |
|---|---|---|---|
| 2008/0017722 A1* | 1/2008 | Snyder | G06Q 10/00 235/494 |
| 2008/0097933 A1* | 4/2008 | Awaida | G06Q 30/0283 705/400 |
| 2008/0114643 A1* | 5/2008 | Milovina-Meyer | G06Q 30/04 705/34 |
| 2008/0120129 A1* | 5/2008 | Seubert | G06Q 40/125 705/305 |
| 2008/0126157 A1* | 5/2008 | Rousso | G06Q 30/08 705/348 |
| 2008/0255863 A1* | 10/2008 | Mack | G06Q 10/10 382/101 |
| 2008/0288274 A1* | 11/2008 | Roccagiovine | G06Q 10/08 705/1.1 |
| 2008/0288463 A1* | 11/2008 | Marks | G06Q 30/0641 |
| 2008/0294536 A1* | 11/2008 | Taylor | G06Q 10/087 705/28 |
| 2008/0302866 A1* | 12/2008 | Baugh | G06Q 10/08 235/494 |
| 2010/0057596 A1* | 3/2010 | Sundel | G06Q 10/0831 707/E17.014 |
| 2010/0067041 A1* | 3/2010 | Endruscheit | G07B 17/00508 358/1.15 |
| 2010/0145754 A1* | 6/2010 | Rahman | G06Q 10/06 705/28 |
| 2010/0185539 A1* | 7/2010 | Lemme | G06Q 20/14 705/40 |
| 2010/0268648 A1* | 10/2010 | Wiesman | G06Q 20/12 235/379 |
| 2010/0299278 A1* | 11/2010 | Kriss | G06Q 10/08 705/332 |
| 2011/0029429 A1* | 2/2011 | Whitehouse | G06Q 20/10 235/375 |
| 2011/0066549 A1* | 3/2011 | Whitehouse | G06Q 20/10 705/401 |
| 2011/0106714 A1* | 5/2011 | Junger | G06Q 20/209 235/375 |
| 2012/0116928 A1* | 5/2012 | Gventer | G06Q 10/083 705/28 |
| 2013/0060658 A1* | 3/2013 | Quan | G06Q 30/06 705/26.25 |
| 2013/0218723 A1* | 8/2013 | Masud | G06Q 50/28 705/26.62 |
| 2013/0304663 A1* | 11/2013 | Whitehouse | G06Q 30/06 705/333 |
| 2014/0058971 A1* | 2/2014 | Muppirala | G06Q 10/0831 705/333 |
| 2014/0279440 A1* | 9/2014 | Felix | G06Q 10/08345 705/331 |
| 2015/0088750 A1* | 3/2015 | Dua | G06Q 20/40 705/44 |
| 2015/0228032 A1* | 8/2015 | Guenther | G06Q 40/125 705/32 |
| 2015/0254366 A1* | 9/2015 | Ravagnani | G06F 16/258 709/204 |
| 2016/0073228 A1* | 3/2016 | Howe | G06Q 10/083 455/456.1 |
| 2016/0364777 A1* | 12/2016 | Josefiak | G06F 3/04842 |
| 2017/0366676 A1* | 12/2017 | Ku | H04M 7/0075 |
| 2018/0053152 A1* | 2/2018 | Chalmers | G06Q 10/087 |
| 2018/0096296 A1* | 4/2018 | Papancea | G06Q 10/087 |
| 2018/0096433 A1* | 4/2018 | Belz | H04N 7/183 |
| 2018/0165642 A1* | 6/2018 | Krieg | G06F 9/451 |
| 2018/0218033 A1* | 8/2018 | Utla | G06F 16/243 |
| 2019/0007519 A1* | 1/2019 | Doran | H04L 67/63 |
| 2019/0164118 A1* | 5/2019 | Sandberg | G06F 16/27 |
| 2019/0279153 A1* | 9/2019 | Ovadia | G08B 21/12 |
| 2019/0303841 A1* | 10/2019 | Hanks | G06Q 30/04 |
| 2020/0027059 A1* | 1/2020 | Felix | G06Q 10/00 |
| 2020/0058073 A1* | 2/2020 | Diedrich | G06Q 10/087 |
| 2020/0202296 A1* | 6/2020 | Sandberg | G06Q 10/0834 |
| 2020/0265381 A1* | 8/2020 | Willard, III | G06Q 10/0837 |
| 2021/0110449 A1* | 4/2021 | Mack | G06Q 10/08 |
| 2021/0122165 A1* | 4/2021 | Watanabe | G06Q 10/087 |
| 2021/0165979 A1* | 6/2021 | Wilkinson | G06Q 10/0833 |
| 2021/0224894 A1* | 7/2021 | Sun | G06Q 50/26 |

FOREIGN PATENT DOCUMENTS

| | | | | |
|---|---|---|---|---|
| KR | 101658690 B1 | * | 10/2019 | G06Q 10/08 |
| WO | WO-9858303 A2 | * | 12/1998 | G06Q 10/08 |
| WO | 2001024096 | | 4/2001 | |
| WO | WO-0235382 A1 | * | 5/2002 | G06Q 10/10 |
| WO | WO-2007002211 A2 | * | 1/2007 | G06Q 10/08 |
| WO | 2007102810 | | 9/2007 | |

OTHER PUBLICATIONS

Mohamad Reza, "A new model to identifying the benefits of electronic customs services on facilitate exports", published by Asian Journal of Management sciences and education vol. 6(3), on Jul. 2017 (Year: 2017).*

* cited by examiner

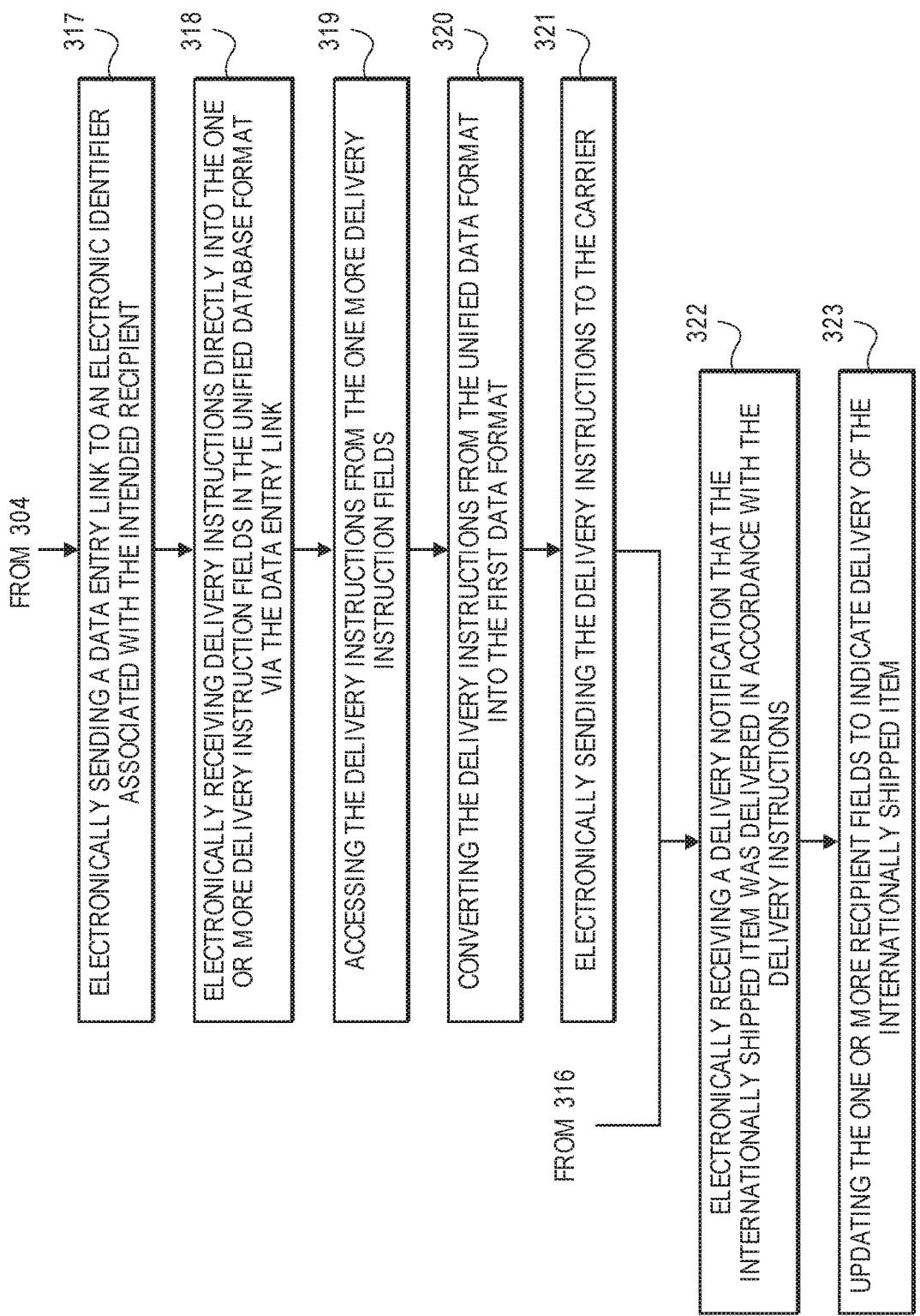

DELIVERING INTERNATIONAL SHIPPED ITEMS

CROSS-REFERENCE TO RELATED APPLICATIONS

This application claims the benefit of U.S. Provisional Application Ser. No. 62/577,104, filed Oct. 25, 2017, which is hereby incorporated herein by reference in its entirety for all purposes.

BACKGROUND

1. Field of the Invention

This invention relates generally to the field of item delivery, and, more particularly, to delivering internationally shipped items.

2. Related Art

The volume of internationally shipped items per day is quite large and continues to increase. When an internationally shipped item enters a country, the importing country typically levees one or more import fees, such as, duties, VAT, or other taxes. Calculating import fees varies between countries and can be based on the sum of purchase cost, taxes, and shipping costs. Depending on a delivery arrangement, different parties to a transaction may be responsible for import fee payment. For example, a "Delivery At Place" (DAP) arrangement assigns import fee payment responsibility to a shipping payee (e.g., the item recipient) upon delivery of an item. On the other hand, a "Delivery Duty Paid" (DDP)) arrangement assigns import fee payment responsibility to an item seller.

In business to consumer (B2C) transactions, a third-party carrier often handles transport of items from one country to another country with subsequent item delivery to a physical location within the other country. Since the carrier physically brings items into the other country, import fees (such as duties/taxes/VAT) are levied against the carrier.

In a DAP arrangement, the importing country may allow the carrier some amount of time to recoup the import fees from item recipients before payment is due. Thus, at the time of item delivery, a carrier representative (i.e., a delivery person) requests import fee payment from an item recipient. Carrier representatives typically do not carry petty cash (for both practical and security reasons) and typically do not carry devices capable of accepting electronic payments. Thus, carrier representatives usually request import fee payment in exact change in local currency.

To delivery an item, a carrier representative transports the item to an indicated physical location and attempts to contact a responsible person at a physical location associated with the intended recipient. If a responsible person is contacted, the carrier representative requests import fee payment. The carrier representative manually collects cash from the responsible person and hands over the item. However, the responsible person may not be aware of the import fee amount due and may not even be the intended recipient (e.g., a spouse, grown child, etc.). Thus, there is some likelihood that the responsible person lacks exact change in local currency when the carrier representative makes contact.

When the responsible person lacks exact change in local currency, the carrier representative cannot hand over the item. The carrier representative is also unable to leave the item when the carrier representative fails to contact a responsible person. Instead, the item remains in possession of the carrier. A subsequent delivery attempt can be made the next day or at some other later time. After a specified number of delivery attempt failures, the carrier can return the item back to the seller. Failed delivery attempts consume carrier resources increasing carrier delivery costs. Alternately, a responsible person can agree to travel to a carrier facility and pay the import fees at the carrier facility. However, this requires a responsible person to go pick up the item even though delivery to the physical location was already paid.

In a DDP arrangement, a seller attempts to pre-calculate import fees and pass the import fees onto a customer at the time of purchase. However, it is difficult to accurately calculate import fees. Import fee structures are complicated to interpret, differ between countries, and a country can change a fee structure any time. As such, accurate import fees amount may not be known until an item arrives at an importing country and the government calculates the import fees. If a pre-calculated amount is less than the actual amount, the carrier is responsible for the difference. Thus, a carrier representative may have to request the balance (in exact change in local currency) at item delivery time, leading to the same difficulties associated with DAP arrangements. If the pre-calculated amount is more than the actual amount, the seller must somehow be refunded the difference. When the discrepancy is a smaller amount, resources consumed refunding the difference may be costlier than the amount itself. Thus, the seller may agree to forgo a refund. However, a cumulative cost of forgoing large numbers of smaller refunds may still financially impact a seller.

BRIEF DESCRIPTION OF THE DRAWINGS

The specific features, aspects and advantages of the present invention will become better understood with regard to the following description and accompanying drawings where:

FIGS. 3A, 3B, and 3C illustrate a flow chart of an example method for delivering an internationally shipped item.

DETAILED DESCRIPTION

Figure 1:
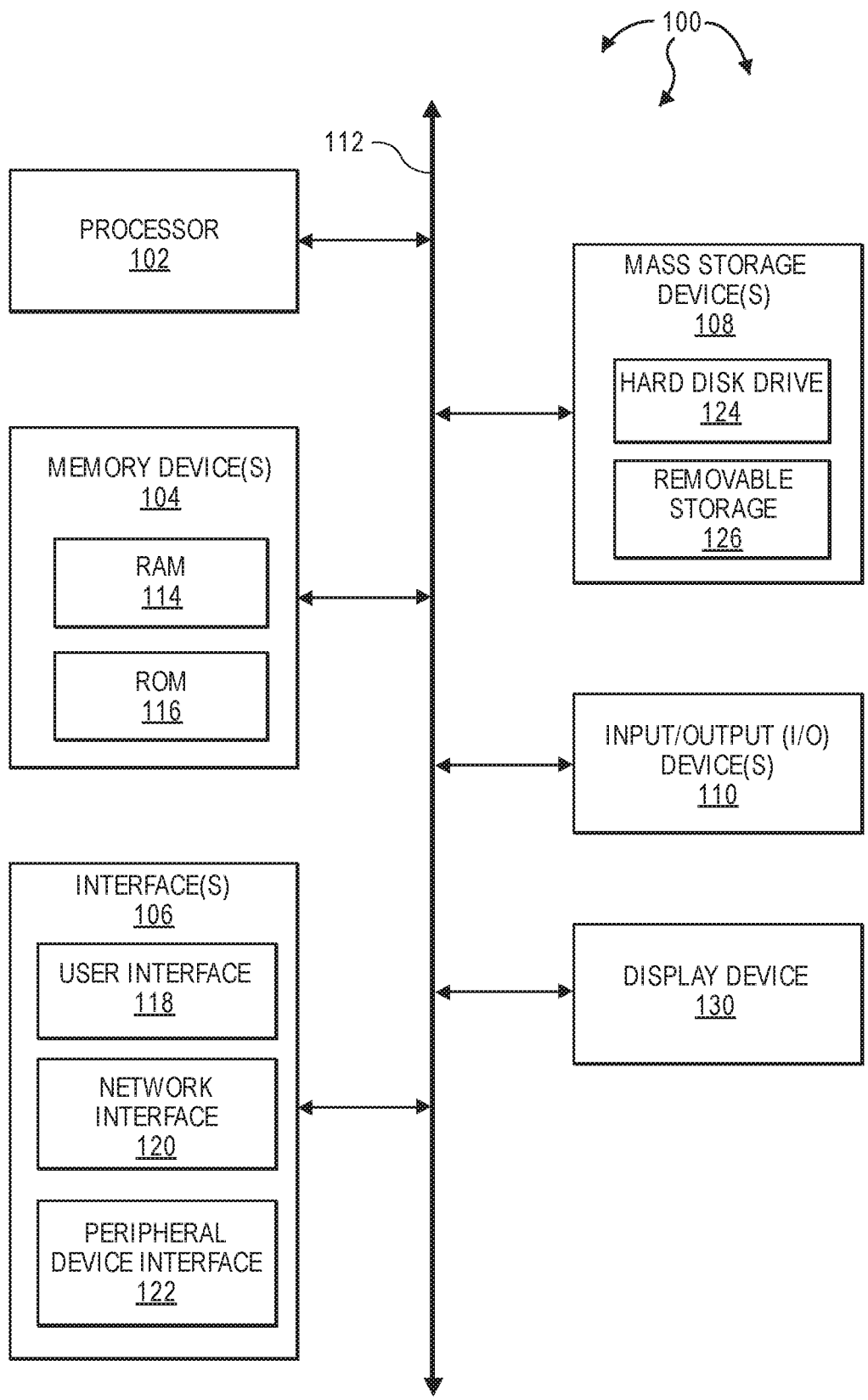
FIG. 1 illustrates an example block diagram of a computing device.

The present invention extends to methods, systems, and computer program products for delivering internationally shipped items.

Business to consumer (B2C) international "Delivery At Place" (DAP) and "Delivery Duty Paid" (DDP) shipping is complex and prone to a number of difficulties. Accurate Duties/taxes/VAT/other fees are not known at time of purchase. In some countries duties/taxes/VAT are based on a sum of purchase cost, taxes, and shipping cost which makes it even more complicated.

A carrier may call a receiver or customer upon customs clearance and collect duty tax via phone prior to the delivery driver arriving. Alternately, a driver can leave a door tag on the door of the receiver informing them what is owed and payment instructions, such as, exact cash/change, call customer service, or have the receiver physically collect from a local office in person. For DAP transactions, payment can be requested in exact cash in local currency at the time of delivery. Payment in exact cash in local currency increases carrier shipping costs and reduces customer satisfaction. Collection of funds using a credit card or other electronic payment over the phone is inefficient, costly, and insecure.

Thus, a variety of parties, such as, government entities, shippers, carriers, brokers, and item recipients, participate in the international shipping and each play some part in delivery of an internationally shipped item. Each party participating in international shipping may separately administer a computer and/or network system. As such, a plurality of separately administered computer and network systems can interoperate with one another, at least to some extent, to facilitate delivery of an internationally shipped item. That is, each individual party participating in an international shipping transaction may utilize their own computer and network systems and may interact with the computer and network systems of multiple other parties (N to N communication paths). Accordingly, when considered in the aggregate, the plurality of separately administered computer and network systems comprise the "international shipping system."

Various computer and network resource inefficiencies are present in the international shipping system. For example, shipping/delivery related activities performed by one party (e.g., manual processes) may not be quickly discernible by another dependent party. Additionally, performance of shipping/delivery related activities by different parties can redundantly generate and/or transport data to and from different computer and network systems. Separately administered computer and network systems can also use different data formats, different data interfaces, and different protocols. Use of different data formats, interfaces, and protocols at different separately administered computer and network systems increases data processing resource requirements across the international shipping system.

Accordingly, aspects of the invention utilize a unifying system and unifying database to consolidate shipping/delivery related information (e.g., generated by and relevant to different parties participating in the international shipping system) in a common (centralized) location. The unifying system and unifying database essentially operate as a centralized shipping information hub. Parties can interact with the unified system to update relevant information corresponding to their shipping/delivery related activities within the unified database. Using a unified system and unified database relieves each separately administered computer and network system from performing communication and data conversions for multiple other separately administered computer and network systems. Thus, data processing requirements at separately administered computer and network system are reduced. In turn, overall data processing requirements across the international shipping system are also reduced permitting the international shipping system to operate more efficiently and effectively.

When one party generates or updates information, other parties can be automatically notified electronically in essentially real time of status changes relevant to item delivery. Electronic messages can be sent using local messaging systems. For example, a local telephone number can be used to text an intended item recipient. Accordingly, information from customs, a shipper, a carrier, a broker, and an intended recipient are better integrated in a platform where parties cooperatively communicate to accomplish item delivery.

Information stored in the unifying database can be maintained in an anonymous format obscuring any personal information. Information associated with completed delivery transactions can be leveraged for reflective, prospective, projective, descriptive, predictive, prescriptive and other analytics, patterns and strategic decisions including providing analytic information and data sets back to carriers, governmental entities, or other companies. Collected data can span multiple carriers and multiple governmental entities. As such, item delivery insights not available to individual carriers or individual governmental entities can be derived from data stored in the unifying database.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, radars, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

In this description and the following claims, "personal information" is described as one or more portions of data that when considered individually or in the aggregate relate to the identity of a natural person or can be used to identify a natural person. Personal information is defined to include personally identifiable information (PII), sensitive personal information (SPI), or other information that can be used on its own or with other information to identify, contact, or locate a single person, or to identify an individual in context. Personal information can include but is not limited to: full name, first name, last name, home address (or portions thereof), email address, nation identification number, passport number, vehicle registration plate, driver's license, face, fingerprints, handwriting, credit card numbers, digital identity, date of birth, birthplace, login name, social media identifier, mobile telephone number, nickname, age, gender, employer, school name, criminal record, job position, etc.

In this description and the following claims, "Delivery At Place" (or DAP) is defined as a shipping arrangement denoting that an intended recipient is responsible for payment of import fees (e.g., duties, VAT, other taxes, etc.) associated with an item upon delivery of the item.

In this description and the following claims, "Delivery Duty Paid" (or DDP) is defined as a shipping arrangement where the seller bears the risks and costs, including import fees (e.g., duties, VAT, other taxes, etc.) and other charges of delivery an item.

In this description and the following claims, a "carrier" is defined as an entity that handles actual shipment of an item via one or more of: air, sea, or land In this description and the following claims, "electronic data interchange" (or EDI) is defined as an interface format for exchanging data, such as, for example, JavaScript Object Notation (JSON), eXtensible Markup Language (XML), message queue (MQ), etc.

Figure 2:
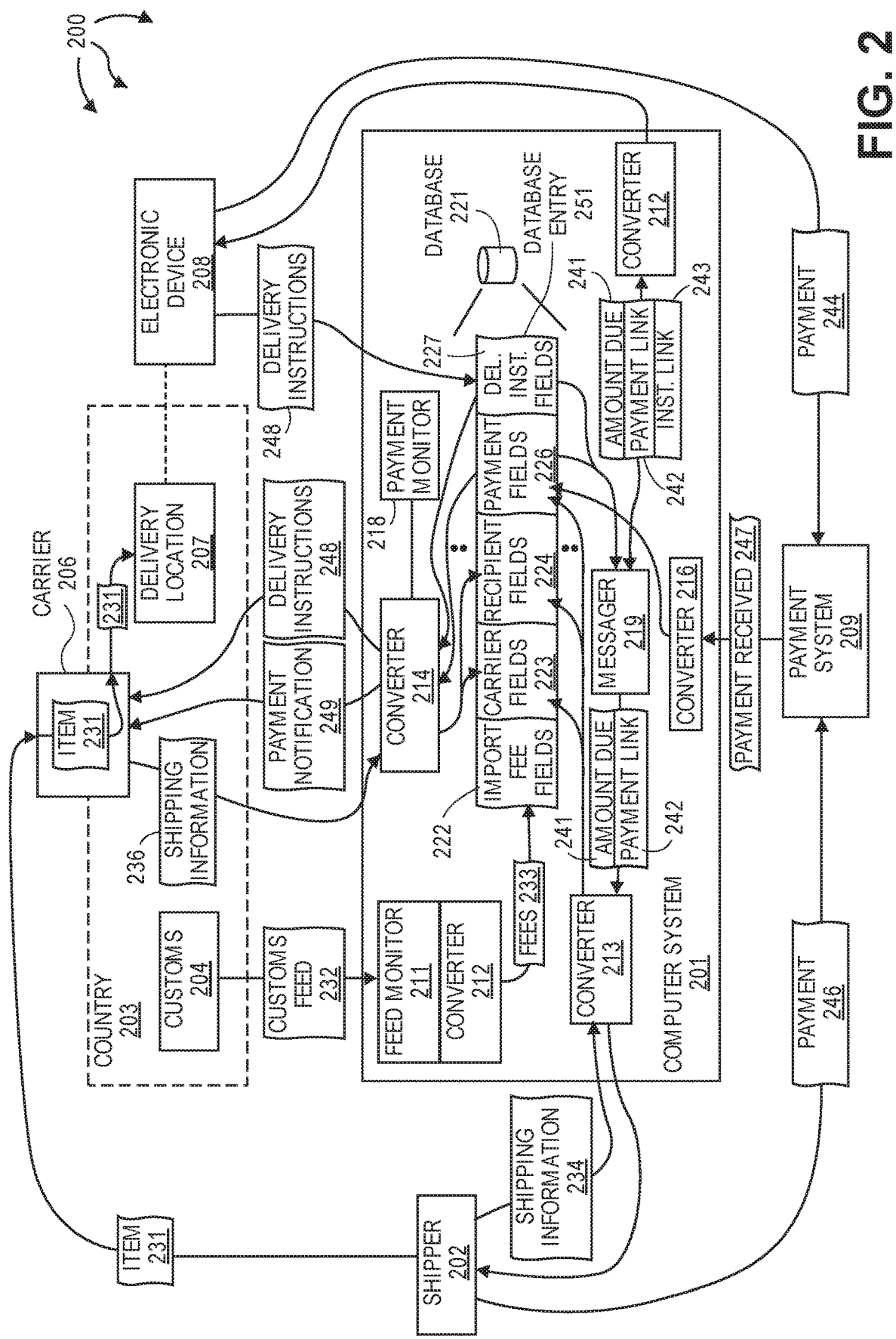
FIG. 2 illustrates an example computer architecture that facilitates delivering internationally shipped items.

FIG. 2 illustrates an example computer architecture 200 that facilitates delivering internationally shipped items.

As depicted, computer architecture 200 includes computer system 201, shipper 202, customs 204, carrier 206, electronic device 208, and payment system 209. Computer system 201, shipper 202, customs 204, carrier 206, electronic device 208, and payment system 209 can be connected to (or be part of) a network, such as, for example, a system bus, a Local Area Network ("LAN"), a Wide Area Network ("WAN"), and even the Internet. Accordingly, computer system 201, shipper 202, customs 204, carrier 206, electronic device 208, and payment system 209 as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

Various components depicted in computer architecture may also represent entire networks. For example, shipper 202 can represent a computer network of an E-commerce website. Carrier 206 can represent a computer network of a carrier that transports items internationally via any of land, sea, and air. Customs 204 can represent a computer network of a governmental agency that handles imports (and possibly exports) for country 203. Carrier 206 can have a physical presence both inside and outside of country 203.

At least some of shipper 202, customs 204, carrier 206, electronic device 208 and payment system 209 can be configured to communicate using different data protocols, different data formats, different data types, different EDI, etc. Thus, some of shipper 202, customs 204, carrier 206, electronic device 208 and payment system 209 may not be capable of natively communicating with others of shipper 202, customs 204, carrier 206, electronic device 208 and payment system 209. Computer system 201 can include converters configured to communicate with each of shipper 202, customs 204, carrier 206, electronic device 208 and payment system 209. For example, computer system 201 includes converter 212 configured to exchange electronic communication from customer 203, converter 213 configured to exchange electronic communication with shipper 202, converter 214 configured to exchange electronic communication with carrier 213, converter 216 configured to exchange electronic communication with payment system 209, and converter 217 configured to exchange electronic communication with electronic device 208.

Computer system 201 also further includes feed monitor 211, payment monitor 218, messager 219, and database 221. From time to time, shipper 202 and/or carrier 206 can electronically send shipping information for an internationally shipped item that has entered or is to enter country 203. In response to receiving shipping information for an internationally shipped item, database 221 can create a database entry. Further information related to the internationally shipped item can be unified/consolidated in the database entry to facilitate efficient access.

Generally, customs 204 determines an import fees due amount per item entering country 203. As import fees due amounts are determined, the import fees due amounts can be output in customs feed 232. Feed monitor 211 is configured to monitor customs feed 232. Feed monitor 211 can detect import fees due amounts corresponding to internationally shipped items in database entries in database 221. For example, feed monitor 211 can match an import fees amount due to a database entry based on a carrier bill of laden/ waybill/tracking number.

Generally, messager 219 is configured to message a party when data relevant to the party is created and/or updated by another party. For example, messager 219 message a responsible party (payee), for example, either a shipper (e.g., under a DDP arrangement) or intended receipt (e.g., under a DAP arrangement) when an import fee is known. Messager 219 can send an import fee amount due and a payment link used to access payment system 209. The responsible party can access the payment link to access payment system 209 and pay the import fee amount due. Payment system 209 can accept any of a variety of payment methods including Credit card (MasterCard, VISA, American Express, Discover, JCB, Maestro, UATP or others), PayPal, Klara, BitCoin or any other electronic payment method.

Payment system 209 can indicate to computer system 201 that an import fee amount due has been paid. An indication of paid import fees can be stored in a database entry corresponding to an internationally shipped item. Messager 219 can access the indication from the database entry and electronically notify carrier 206 that import fees for an internationally shipped item have been paid. Accordingly, carrier 206 is relieved from having to collect import fees due amounts from intended receipts and from having to settle incorrectly estimated import fees due amounts.

Messager 219 can also send delivery instructions link to an electronic address (e.g., mobile number or e-mail address) of an intended recipient. The delivery instructions link can link directly to a database entry in database 221. The intended recipient can use an electronic device to select the delivery instructions link and enter delivery instructions directly into the database entry. Messager 219 can then access the delivery instructions from the database entry and send the delivery instructions to carrier 206. As such, an intended recipient can authorize carrier 206 to leave an internationally shipped item, for example, when he or she is unavailable or unwilling to accept an internationally shipped item in person.

Computer system 201 can also include a database manager (now shown) that manages creating data entries in database 221, inserting data into fields in database 221, and accessing data from fields in database 221. Refence to computer system 201 performing database related activities can include interoperation with the database manager. In some aspects, the database manager has primary responsibility for performing database related activities.

Computer system 201 can also include an analytics module (not shown). The analytics module can analyze the contents of database 221 to derive reflective, prospective, projective, descriptive, predictive, prescriptive and other analytics, patterns and strategic decisions that span multiple carriers and governments. As such, item delivery insights not available to individual carriers or individual governmental entities can be derived from data stored in database 221. The analytics module can provide analytic information and data sets back to carriers, governmental entities, and/or other companies.

Figure 3A:
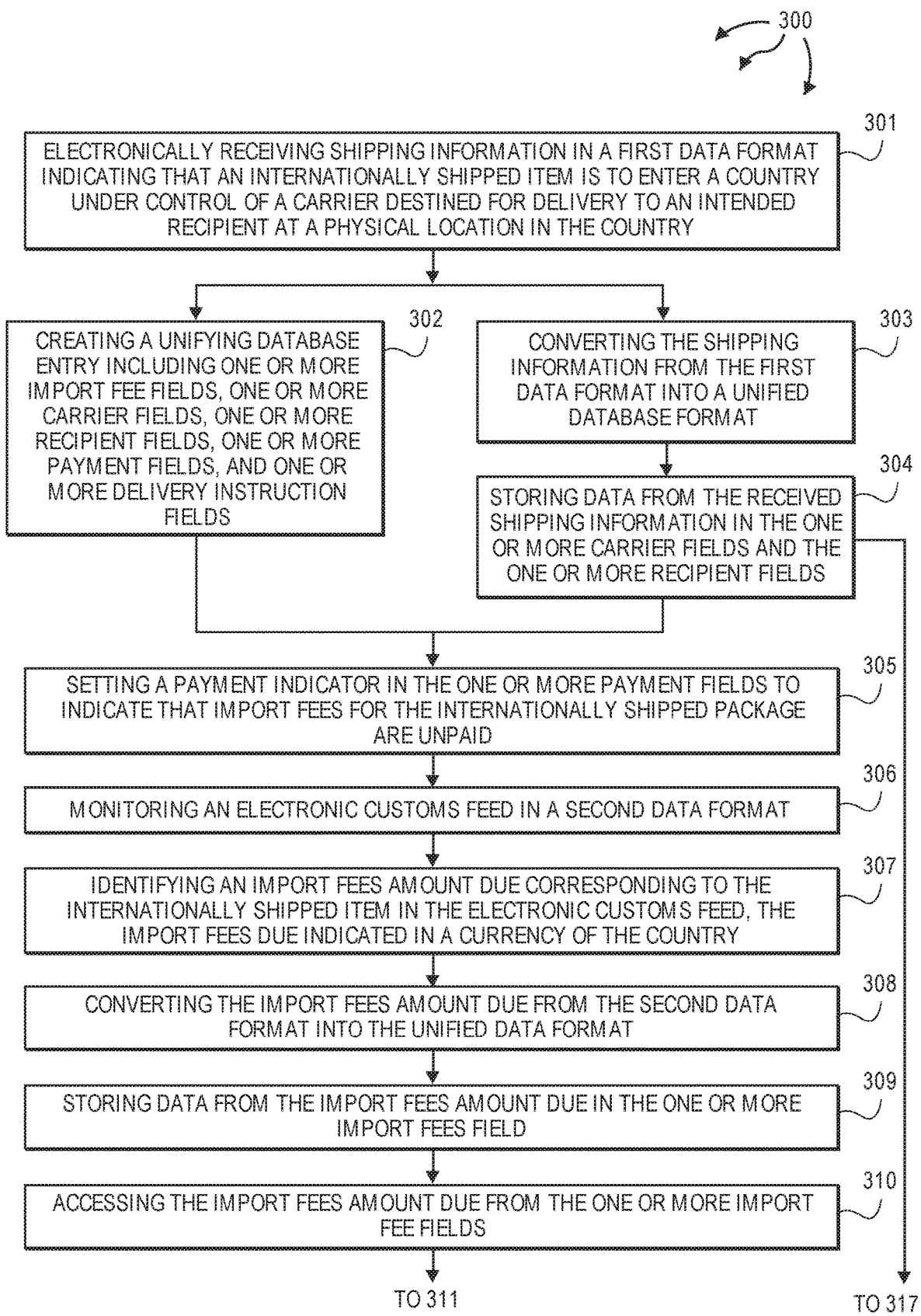
Figure 3B:
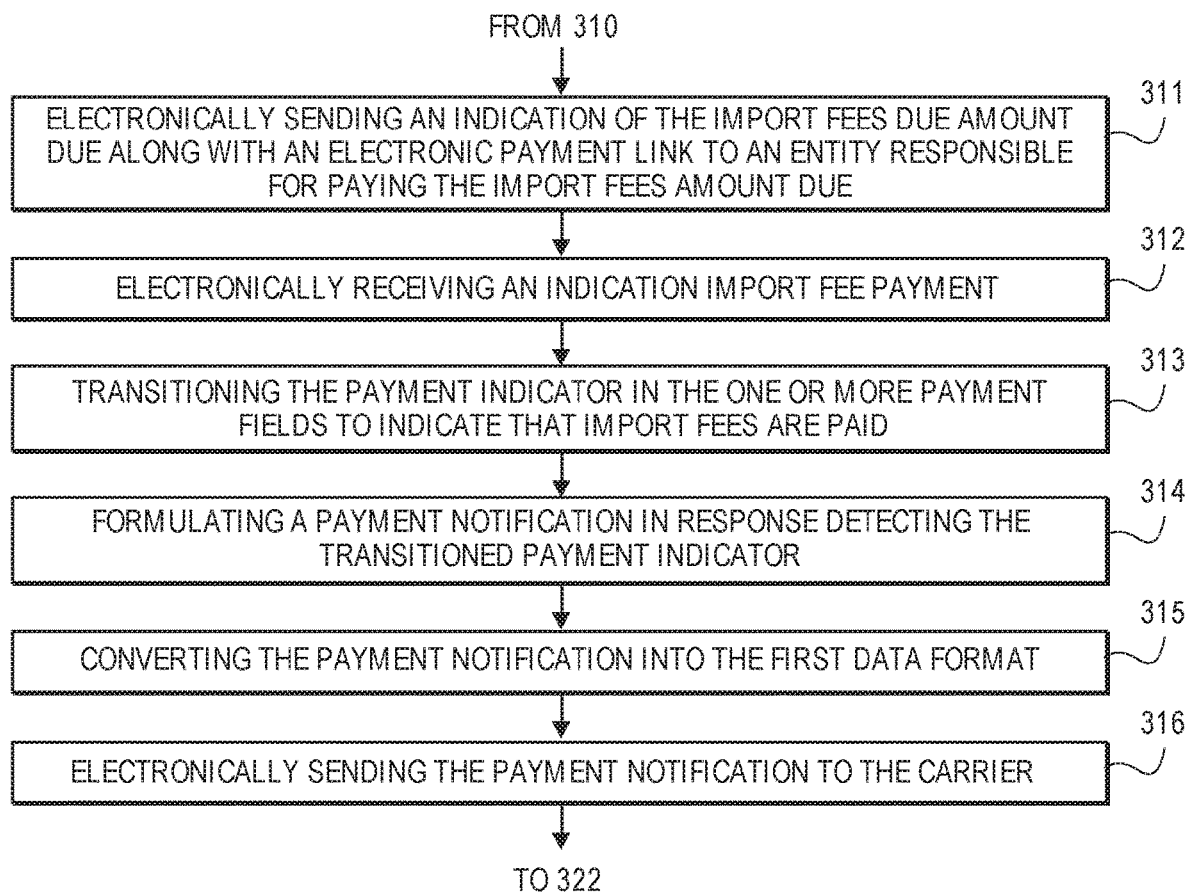

FIGS. 3A, 3B, and 3C illustrate a flow chart of an example method 300 for delivering an internationally shipped item. Method 200 will be described with respect to the components and data in computer architecture 200.

Method 300 includes electronically receiving shipping information in a first data format indicating that an internationally shipped item is to enter a country under control of a carrier destined for delivery to an intended recipient at a physical location in the country (301). For example, computer system 201 can receiving information 234 from shipper 202 and/or can receive shipping information 236 from carrier 206. Shipping information 234 and/or shipping information 236 can indicate that item 231 is being internationally shipped to country 203 under the control of carrier 206 for delivery to an intended recipient at delivery location 207. In one aspect, shipper 202 provides shipping information 234 and carrier 206 subsequently updates with shipping information 236. For example, shipper 202 can send a bill of laden/waybill/tracking number and destination. Carrier can update to indicate that item 203 has entered country 203. Shipping information 234 and shipping information 236 can be in different data formats.

Method 300 includes creating a unifying database entry including one or more import fee fields, one or more carrier fields, one or more recipient fields, one or more payment fields, and one or more delivery instruction fields (302). For example, in response to receiving shipping information 234 or shipping information 236, computer system 201 can create database entry 251 in database 221. Computer system 201 can use database entry 251 to unify information storage relating to internationally shipment of item 231.

Method 300 includes converting the shipping information from the first data format into a unified database format (303). For example, converter 213 can convert shipping information 234 into a format of database 221. Similarly, converter 214 can convert shipping information 236 into the format of database 221.

Method 300 includes storing data from the received shipping information in the one or more carrier fields and the one or more recipient fields (304). For example, computer system 201 can store data from shipping information 234 in carrier fields 222, recipient fields 224, and payment fields 226. Computer system 201 can also store data from shipping information 236 in carrier fields 223 and recipient fields 224 (e.g., to update data from shipping information 234 when addition in information is known). Data stored in carrier fields 223 can identifier carrier 206 and track the shipping progress of item 231 from an originating location into country 203. Data stored in recipient fields 224 can identify an intended recipient and delivery location (e.g., address in country 203). Payment fields 226 can include a payment indicator and define payment responsibility (e.g., shipper 202 or to the intended recipient).

Method 300 includes setting a payment indicator in the one or more payment fields to indicate that import fees for the internationally shipped package are unpaid (305). For example, computer system 201 can set a payment indicator in payment fields 226 to indicate that import fees for item 231 are unpaid.

Method 300 includes monitoring an electronic customs feed in a second data format (306). For example, feed monitor 211 can monitor customs feed 232. Customs feed 232 can be in a different format than shipping information 234 and shipping information 236. Method 300 includes identifying an import fees amount due corresponding to the internationally shipped item in the electronic customs feed, the import fees due indicated in a currency of the country (307). For example, feed monitor can identify fees 233 corresponding to item 231 (e.g., by bill of laden/waybill/tracking number). Fees 233 can indicate an amount in a currency of country 203.

Method 300 includes converting the import fees amount due from the second data format into the unified data format (308). For example, converter 212 can convert fees 233 into the format of database 221. Method 300 includes storing data from the import fees amount due in the one or more import fees field (309). For example, computer system 201 can store fees 233, including an amount due and currency type, in import fee fields 222.

Method 300 includes accessing the import fees amount due from the one or more import fee fields (310). For example, computer system can access fees 233 from import fee fields 222. Method 300 includes electronically sending an indication of the import fees due amount due along with an electronic payment link to an entity responsible for paying the import fees amount due (311). For example, computer system 201 can refer to payment fields 226 to determine payment responsibility for fees 233. Computer system 201 can formulate amount due 241 and payment link 242.

When shipper 202 is responsible for fees, converter 213 can convert amount due 241 and payment link 242 to a format compatible with shipper 202. Computer system can send amount due 241 and payment link 242 to shipper 202. When the intended recipient is responsible for fees, amount due 241 and payment link 242 are sent an electronic identifier (e.g., module number or email address associated with the intended recipient). In one aspect, the intended recipient (or associated party, for example, spouse, adult child, neighbor, etc.) accessing data at electronic device 208 (e.g., as mobile phone or computer). Converter 217 converts amount due 241 and payment link into a format compatible with electronic device 208, such as, an email message, an SMS message, an MMS message, etc. Computer system 201 sends amount due 241 and payment link 242 and electronic device 208 accesses amount due 241 and payment 242.

Method 300 includes electronically receiving an indication import fee payment (312). In one aspect, shipper 202 accesses payment link 242 and submits payment 216 to payment system 209. In another aspect, a user of electronic device 208 accesses payment link 242 and submits payment 214 to payment system 209. As described, any of a variety of payment methods including Credit card (MasterCard, VISA, American Express, Discover, JCB, Maestro, UATP or others), PayPal, Klara, BitCoin or any other electronic payment method can be used. Payment system 209 can handle converting received payment to the currency of country 203 and can settle payment of fees 233 with country 203.

When payment is received, payment system 209 can send payment received indicator 247 to computer system 201. Payment system 209 may use a different data format than shipper 202, carrier 206, customs 204, and electronic device 208. Converter 216 can convert payment received indicator 247 into the format of database 221.

Method 300 includes transitioning the payment indicator in the one or more payment fields to indicate that import fees are paid (313). For example, in response to payment received indicator 247, computer system 201 can transition a payment indicator for item 231 in payment fields 226 to indicate that fees 233 are paid.

Method 300 includes formulating a payment notification in response detecting the transitioned payment indicator (314). For example, payment monitor 218 can monitor the payment indicator for item 231 in payment fields 226. When payment monitor 218 detects a transition in the payment indicator, computer system 201 can formulate payment notification 249. Method 300 includes converting the payment notification into the first data format (315). For example, converter 214 can convert payment notification 249 into a data format compatible with carrier 206. Method 300 includes electronically sending the payment notification to the carrier (316). For example, computer system 201 can send payment notification 249 to carrier 206. Thus, carrier 206 can physically delivery item 231 without having to collect fees 233 at delivery time. As such, it is more likely that item 231 can be delivered in a single delivery attempt.

Method 300 includes electronically sending a data entry link to an electronic identifier associated with the intended recipient (317). For example, computer system 201 can formulate instructions link 243 that links directly to delivery instruction fields 227. Converter 217 can convert instructions link 242 into a data format (e.g., email, SMS, MMS, etc.) compatible with electronic device 208. Computer system 201 can send instructions link 243 and electronic device 208 can receive instructions link 243.

Method 300 includes receiving delivery instructions directly into the one or more delivery instruction fields in the unified database format via the data entry link (318). For example, a user of electronic device 208 can access instructions link 243 and enter delivery instructions directly into delivery instruction fields 227. Entering instructions directly into delivery instructions fields 227 reduces processing required to store data in database 221.

Method 300 includes accessing the delivery instructions from the one more delivery instruction fields (319). For example, computer system 201 can access delivery instructions 248 from delivery instruction fields 227. Method 300 includes converting the delivery instructions into the first data format (320). For example, converter 214 can convert delivery instructions 248 into a format compatible with carrier 206. Method 300 includes electronically sending the delivery instructions to the carrier (321). For example, computer system 201 can send delivery instructions 248 to carrier 206. Thus, carrier 206 can be provided with more detailed delivery instructions, such as, for example, leave on back porch, leave behind plant on front porch, leave by side door, etc. As such, it is more likely that item 231 can be delivered in a single delivery attempt, even when carrier 206 fails to contact a responsible adult.

In one aspect, amount due 241, payment link 242, and delivery instructions link 243 are included in a message that is sent to electronic device 208.

Method 300 include electronically receiving a delivery notification that the internationally shipped item was delivered in accordance with the delivery instructions (322). Based on payment notification 249 and delivery instructions 248, carrier 206 can deliver item 231 to delivery location 207. Subsequently, carrier 206 can send an electronic delivery notification to computer system 201. Computer system 201 can receive the electronic delivery notification from carrier 206. Converter 214 can convert the delivery notification into a format compatible with database 221. Method 300 includes updating the one or more recipient fields to indicate delivery of the internationally shipped item (323). For example, computer system 201 can update recipient fields 224 to indicate that item 231 was delivered to delivery location 207 in accordance with delivery instructions 248. Computer system 201 can formulate, convert, and send corresponding delivery notifications to shipper 202 and electronic device 208.

Computer system 201 provides a central compatible location for storing and accessing information related to the delivery of an internationally shipped item. As such, relevant parties can electronically communicate with computer system 201 and are relieved from having to communicate with multiple other parties in manual or otherwise incompatible formats, protocols, EDI, etc. Further, information and updates related to an internationally shipped item can be submitted to and accessed from computer system 201 asynchronously and in essentially real-time as available and/or when relevant to the delivery process. For example, carrier 206 may choose to hold item 231 at a warehouse until fees 233 are paid but can initiate delivery of item 231 to delivery location 207 essentially on demand after payment is received. As such, carrier 206 can strike an appropriate balance between resource consumption (e.g., fuel, vehicle maintenance, computing, etc.) and customer satisfaction.

Figure 4:
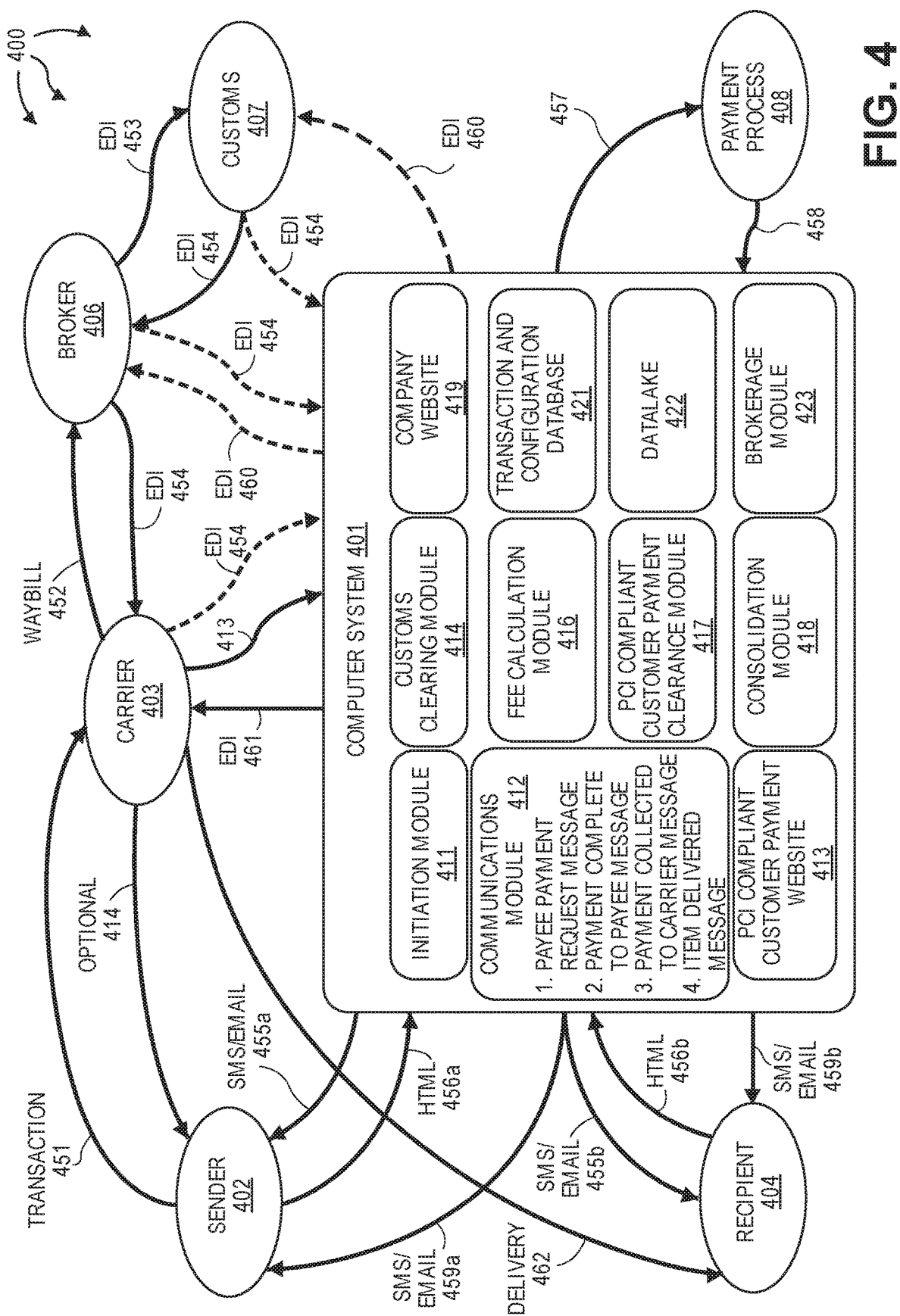
FIG. 4 illustrates another example computer architecture that facilitates delivering internationally shipped items.

FIG. 4 illustrates another example computer architecture 400 that facilitates delivering internationally shipped items. As depicted, computer architecture 400 includes computer system 401, sender 402, carrier 403, recipient 404, broker 406, customs 407, and payment processor 408. Computer system 401 further includes initiation module 411, communication software module 412, payment website 413, customs clearing module 414, fee calculation module 416, payment clearance process 417, consolidation module 418, company website 419, transaction and configuration database 421, data lake 422, and brokerage module 423.

A sender can use initiation module 411 to initiate a delivery transaction. For example, in a B2C transaction, a sender can initiate international shipping of an item purchased online at the sender's website. The item is attached to a carrier to ship to a requested international destination. Computer system 201 receives the order information form the B2C entity and saves the information in database 421 and data lake 422.

Order information can be sent to computer system 101 through an electronic interface and can be any type of software interface format such as JSON, XML or any other Electronic Data Interchange ("EDI") interface. The following information can be captured at saved at computer system 101: Package ID (bill of laden/Waybill/tracking number), Carrier, Total costs (excluding clearing fees since they are likely not known at this point in time), Package content information, Sender contact information, Receiver contact information.

Figure 5:
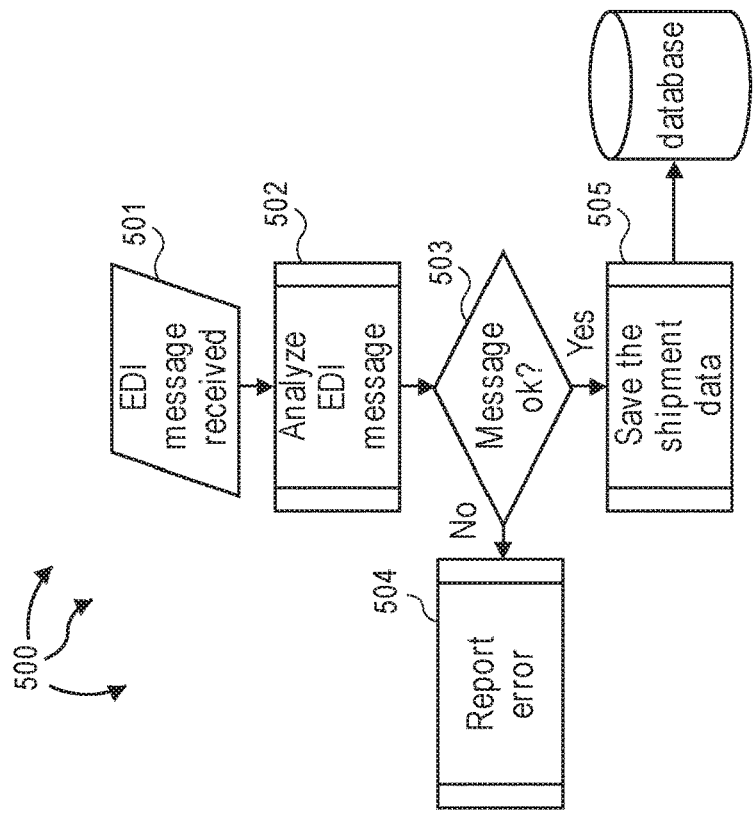
FIG. 5 illustrates a flow chart of an example method for initiating a transaction.

FIG. 5 illustrates a flow chart of an example method 500 for initiating a transaction. Initiation module 411 can implement method 500. Method 500 includes receiving an EDI message (501). Method 500 includes analyzing the EDI message (502). Method 500 includes determining if the EDI message is ok (503). If the EDI message is ok (YES at 503), method 500 includes saving shipment data (505). If the EDI message is not ok (NO at 503), method 500 includes reporting an error (504).

Customs clearing module 414 can be used to clearing an item from customs. When an item has cleared customs and import fees (e.g., duties, VAT, other taxes, etc.) are known, a carrier and/or a broker can be notified through an EDI message. Computer system 201 can "tap" into this EDI workflow without interrupting it, and process everything automatically from there. The "tap" electronic interface can be any type of software interface format such as JSON, XML or any other EDI interface.

The following information can be captured at saved at computer system 101: Package ID (bill of laden/waybill/tracking number), Carrier, Total clearing fees (what the Payee has to pay), Package content information, Sender contact information, Receiver contact information. When the information is received, it can be saved in database 421 and data lake 422. In one aspect, the functionality of database 421 and data lake 422 is implemented in database 221.

Figure 6:
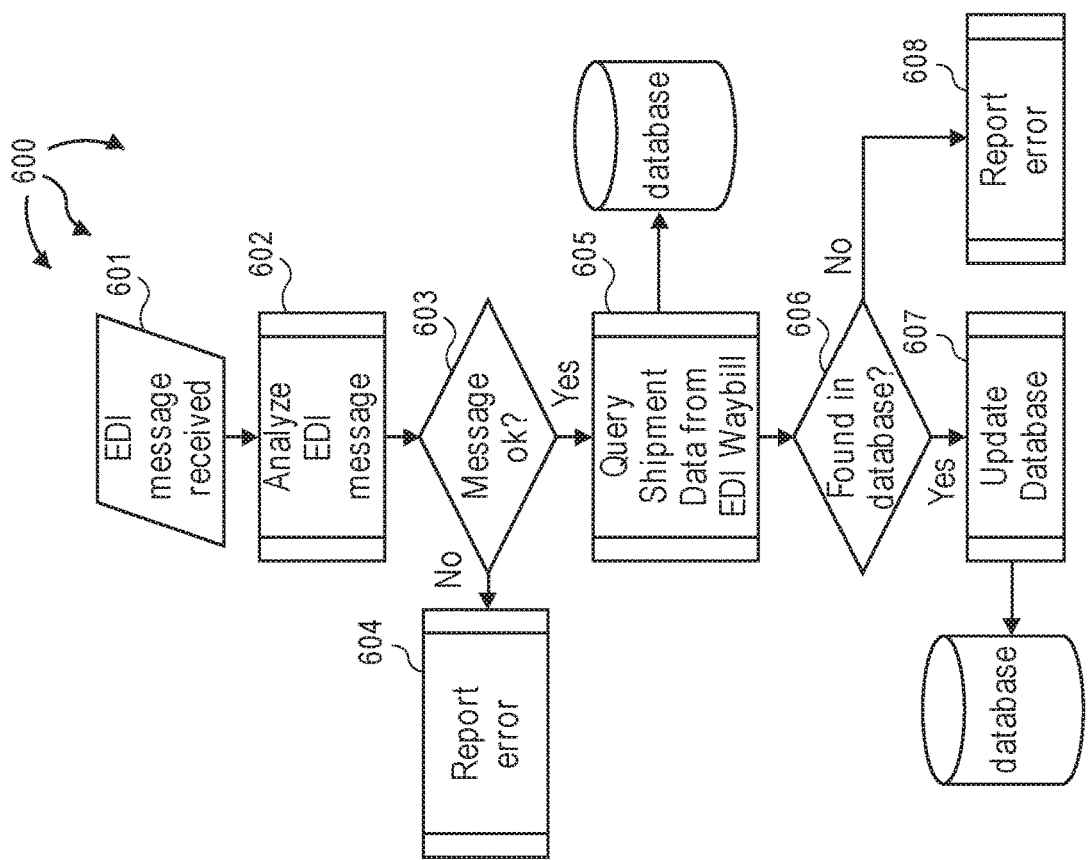
FIG. 6 illustrates a flow chart of an example method for processing an item cleared from custom.

FIG. 6 illustrates a flow chart of an example method 600 for processing an item cleared from customs. Customs clearing module 411 can implement method 600. Method 600 includes receiving an EDI message (601). Method 600 includes analyzing the EDI message (602). Method 600 includes determining if the EDI message is ok (603). If the EDI message is not ok (NO at 603), method 600 includes reporting an error (604). If the EDI message is ok (YES at 603), method 600 includes querying shipment data from EDI bill of laden/waybill/tracking number (605). Method 600 includes determining if shipment data was found in the database (606). If shipment data was found in the database (YES at 606), method 600 includes updating the database (607). If shipment data was not found in the database (NO at 606), method 600 includes reporting an error (608).

Fee calculation module 416 can be used to calculate an additional fee for computer system 101 to provide services to unify/consolidate data from sender 402, carrier 403, recipient 404, broker 406, customs 407, and payment processor 408. The additional fee can be calculated based on one or more of the shipping company, the value of the product shipped, originating location, final destination, any contract the owner of computer system 101 has with the carrier company and/or sender and other parameters.

Figure 7:
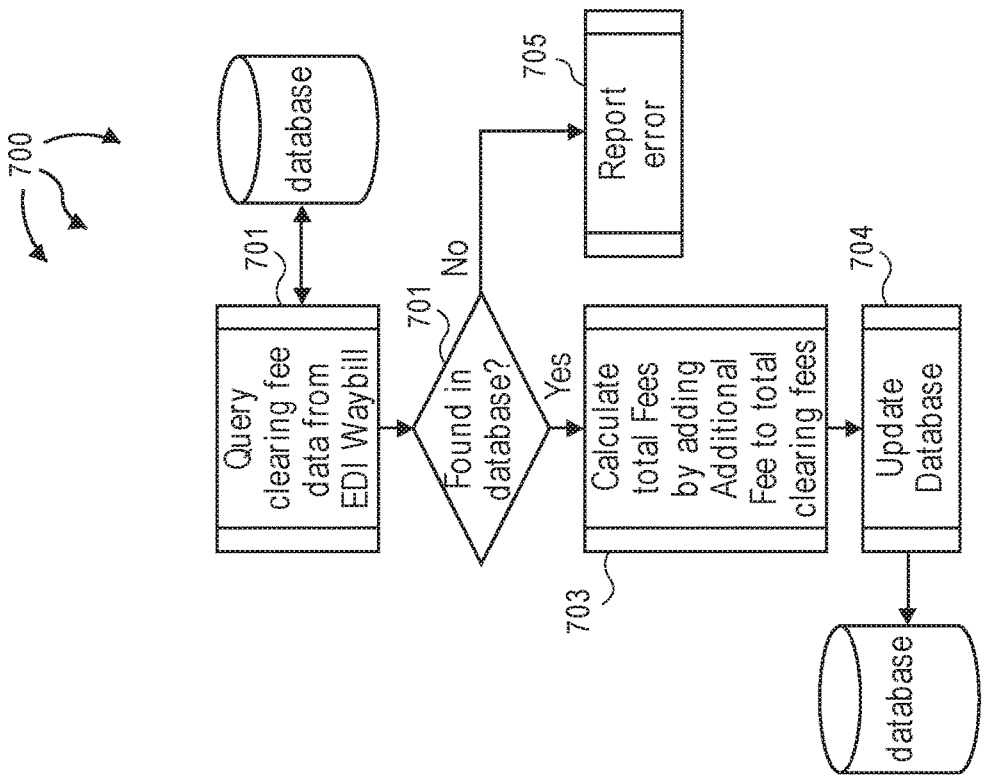
FIG. 7 illustrates a flow chart of an example optional method for calculating an additional fee.

FIG. 7 illustrates a flow chart of an example optional method 700 for calculating an additional fee. Fee calculation module 416 can implement method 700. Method 700 includes querying a clearing fee from EDI bill of laden/waybill/tracking number (701). Method 700 includes determining if shipment data was found in the database (702). If shipment data was not found in the database (NO at 702), method 700 includes reporting an error (705). If shipment data was found in the database (YES at 702), method 700 includes calculating total fees by adding an additional fee to total clear fees (703) and updating the database (704).

Payment clearance process 417 can send a payee payment request message. The payment request message can request payment of clearance fees. Payment clearance process 417 can dynamically create a message to be sent to payee, potentially from multiple data sources, including database 421. Information in the payee message can include: Shipment ID (bill of laden/Waybill/tracking number) from Carrier, Package description, Sender name, Language selection (not shown to the Payee), Payees contact information, fee amount due, link to payment website 413, and description from the seller or online shopping cart (so Payee to can easily recognize transaction).

Communications module 412 can build messages from templates with dynamic information inserted into the header and content of the messages. It is created in the local language of the Payee. Contact information can be retrieved from a previously received item ID. If the Payee has a mobile number, a text message can be built. If the Payee has an email address, an email can be built. If the Payee has both mobile and email address, both a text message and an email can be built. Payment clearance process 417 can send the text message/email to the payee.

The text message/email contains a link to payment website 413 and includes the unique item ID as the vehicle to later identify the package and the Payee. When the text message/email has been formed, it will be sent to the Payee and the information is saved in the transaction and configuration database 421. Consolidation module 418 manages message expiration payment is not received within a set time frame. Payment clearance process 417 can send multiple messages to the Payee, prior to the delivery. The time between the messages is configurable.

Figure 8:
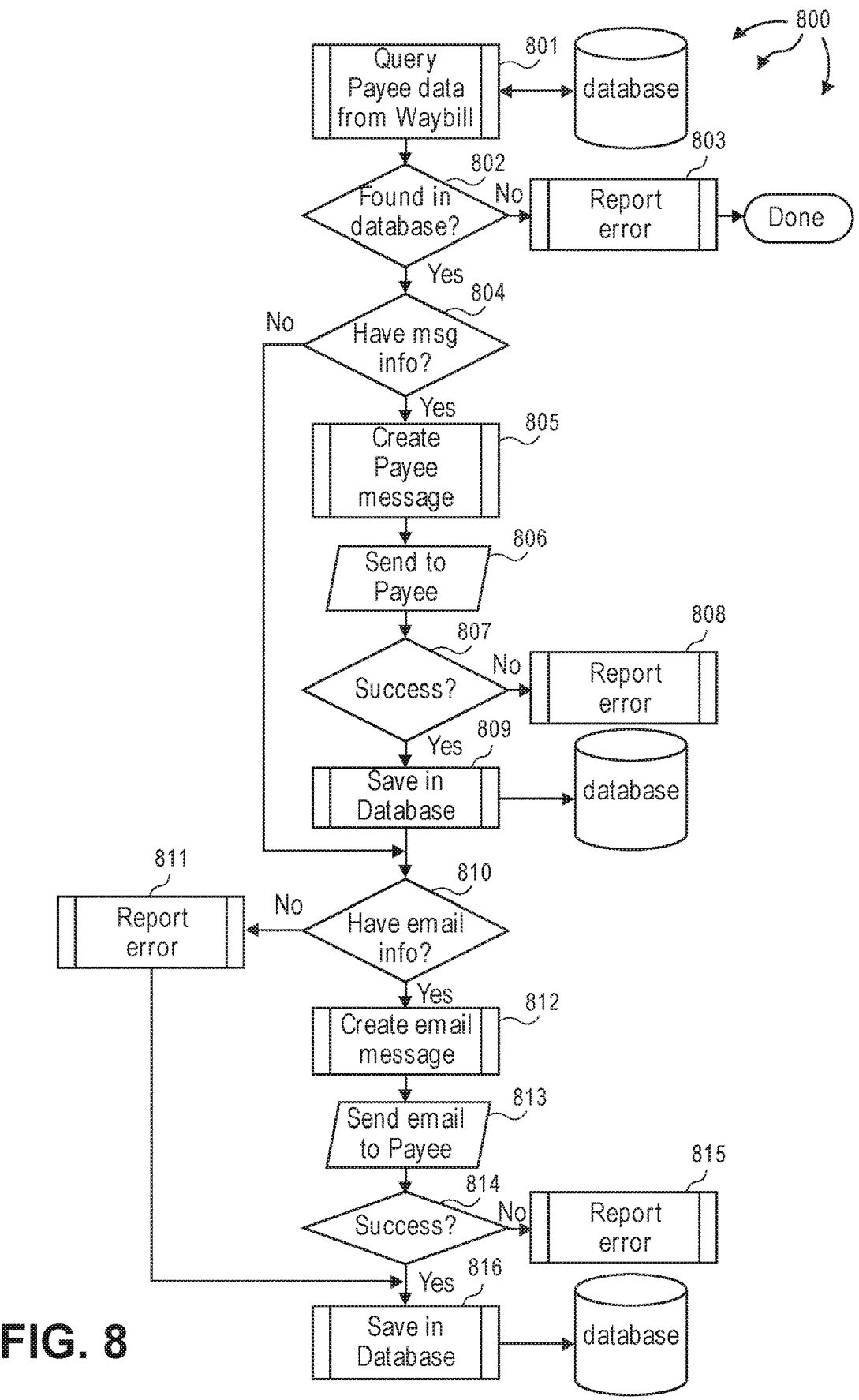
FIG. 8 illustrates a flow chart of an example method for requesting payment for import fees.

FIG. 8 illustrates a flow chart of an example optional method 800 for requesting payment for import fees. Communications module 412 can implement method 800. Method 800 includes querying payee data from EDI bill of laden/waybill//tracking number (801). Method 800 includes determining if payee data was found in the database (802). If payee data was not found in the database (NO at 802), method 800 includes reporting an error (803). If payee data was found in the database (YES at 802), method 800 includes determining if text message information (e.g., a mobile phone number) is included in the payee data (804).

If text message information is not included in payee data (NO at 804), method 800 includes determining if email information is included in payee data (810). If text message information is included in payee data (YES at 804), method 800 includes creating a payee text message (805) and sending the payee text message to the payee (806). Method 800 includes determining if the text message was successful (807). If the text message was not successful (NO at 807), method 800 includes reporting an error (808). If the text message was successful (YES at 807), method 800 includes saving the message to the database (808).

Method 800 includes determining if email information is included in payee data (810). If email information is not included in payee data (NO at 810), method 800 includes reporting an error (811). If email information is included in payee data (YES at 810), method 800 includes creating an email message (812) and sending the email message to the payee (813). Method 800 includes determining if the email message was successful (814). If the email message was not successful (NO at 814), method 800 includes reporting an error (815). If the email message was successful (YES at 814), method 800 includes saving the email message to the database (816).

Payment website 413 can serve a payment webpage for desktop, laptop, tablet, and mobile users. After a payee receives a test message/email, a payee can decide to pay fees electronically to avoid paying cash at delivery time (if the payee is a shipper this permits the shipper to avoid having to settle up inaccurate import fee estimates). The served web page can be built for mobile devices and browsers with a similar look at feel.

A payee can select a link included in the text and/or email message. Upon link selection the payee is directed to payment website 413. An item ID (bill of laden/Waybill/tracking number) can be passed on as a parameter (primary key) so that the item and Payee can be properly identified. Payment website 413 can access the package information/ID, Fees and Payee information from database 421.

Payment website 413 can present the Payee with a set of options to pay the Fees with (credit card, PayPal and others). If the Payee already has a default credit card or PayPal account on file, the stored information can be used, allowing a single click transaction. If the Payee has the default payment option from previous transaction (saved credit card information), the Payee can edit in the 3 or 4-digit security key for a credit card transaction and the click on "Approve" (other fields are pre-populated with the saved default payment option information from the payment process.) If the Payee has the default payment option from previous transaction (saved PayPal information), the Payee can present PayPal credentials and then click on "Approve". If the Payee has the default payment option from previous transaction (for any other payment type), the Payee can present the minimal credentials and then click on "Approve". If the Payee does not have any information on file, areas that need to be filled out can be presented similar to a shopping cart checkout. The Payee can fill in the requested information and clicks on "Approve."

Payment website 413 can provide a checkbox for the Payee to allow for the delivery to be left at the delivery address without a signature, should the type of package allow for that. Payment website 413 can provide a checkbox and an edit box for the Payee to enter delivery instructions to the carrier. An Approval button can be enabled when the Payee has entered information for the transaction.

Figure 9:
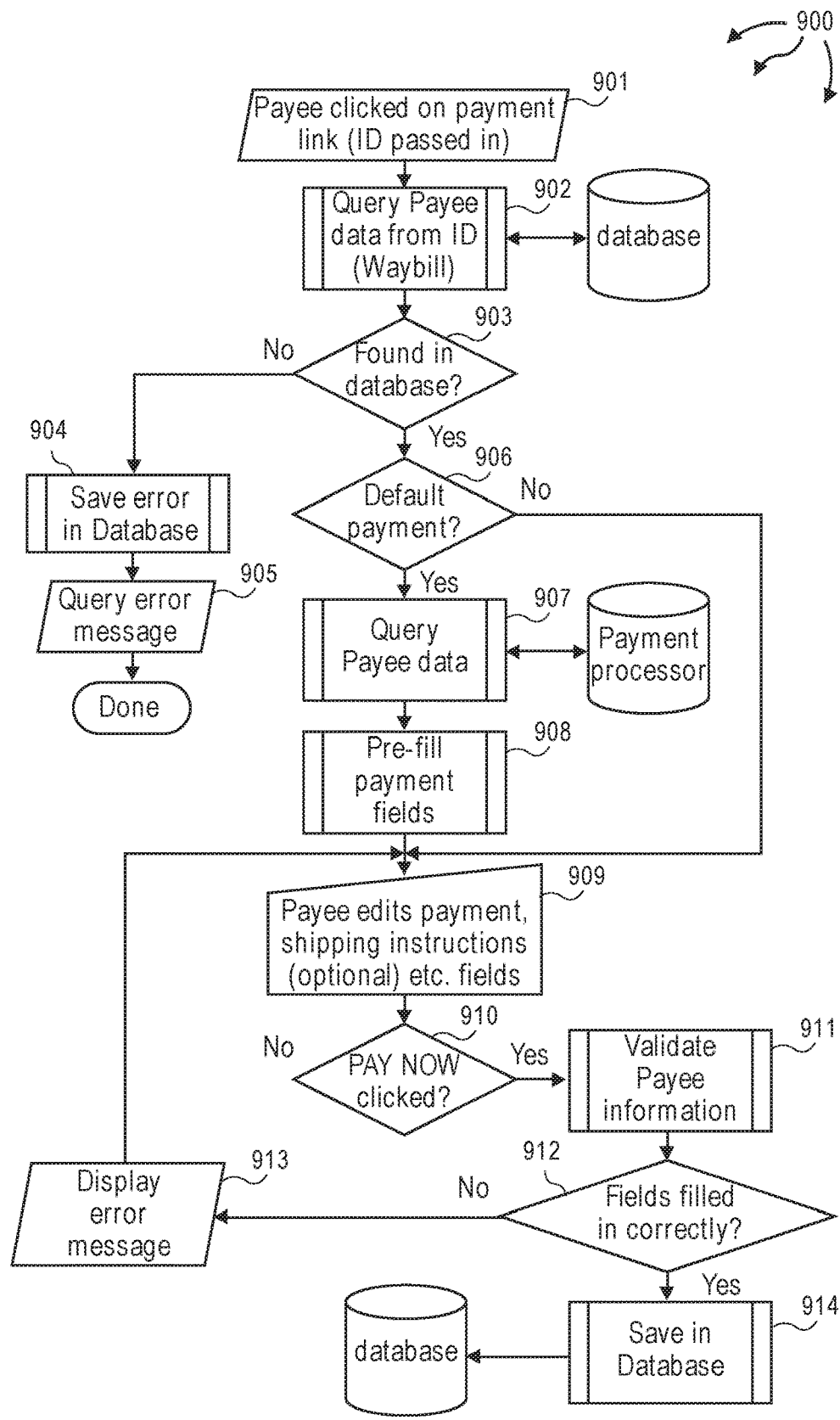
FIG. 9 illustrates a flow chart of an example method for receiving an import fees payment.

FIG. 9 illustrates a flow chart of an example method 900 for receiving an import fees payment. Payment website 413 can implement method 900. Method 900 includes detecting that a payee clicked on a payment link (901). Method 900 includes querying payee data from EDI bill of laden/waybill/tracking number (902). Method 900 includes determining if payee data was found in the database (903). If payee data was not found in the database (NO at 903), method 900 includes saving an error in database (904) and displaying an error message to payee (905).

If payee data was found in the database (YES at 903), method 900 determines if payee has a default payment option (906). If pay has a default payment option (YES at 906), method 900 queries payee data from a payment processor (907) and prefills payment fields (908). Method 900 includes payee optionally editing payment, shipping instructions, etc. (909). Method 900 includes determining if "pay now" is clicked (910).

If "pay now" is not clicked (NO at 910), method 900 loops back to 909. If "pay now" is clicked (YES at 910), method 900 validates payee information (911). Method 900 includes determining is fields are filled in correctly (912). If fields are not filed in correctly (NO at 912), an error message is displayed (913) and method 900 loops back to 909. If fields are filed in correctly (YES at 913), information is save to the database (914).

Payment clearance module 417 can clear a payment. After a payee clicks an "Approved" button, payment clearance module 417 can initiate a payment transaction. If entered information is incorrect or incomplete, an error message can be presented to the Payee. Attempts to obtain correct and complete information can continue until the Payee either successfully completes the transaction, times out for inactivity, leaves website 413 or cancels the transaction. When a transaction is canceled or the payee leaves website 413 idle for a specified amount of time, information can be cleared from the Payee edit session.

When a transaction is successful, clearance module 417 can display a "payment completed message" to the Payee at website 413. Computer system 401 saves the transaction information to database 421. Computer system 401 sends a message to the carrier indicating that fees are paid. When appropriate, the message can also indicate any delivery instructions (e.g., package can be delivered without a signature). If the Payee has checked the "Make this payment method my default payment method" checkbox, their payment information can be stored at a payment processor as the default payment method.

Figure 10:
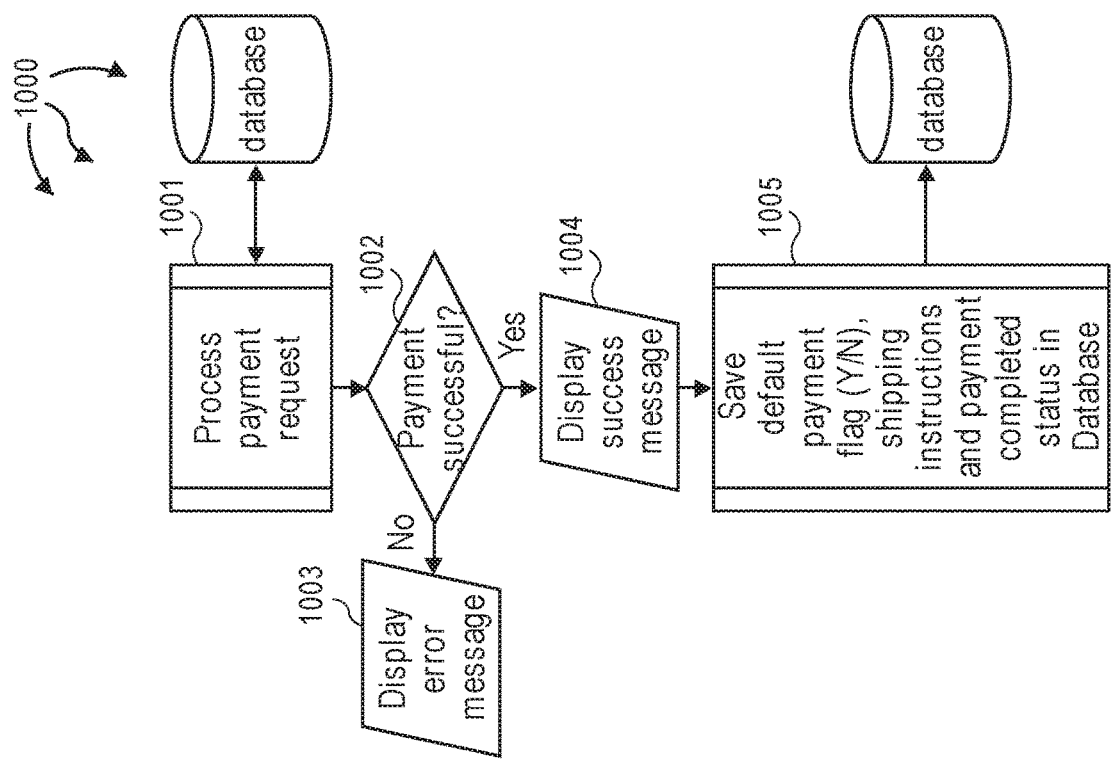
FIG. 10 illustrates a flow chart of an example method for clearing an import fees payment.

FIG. 10 illustrates a flow chart of an example method 1000 for clearing an import fees payment. Payment clearance module 417 can implement method 1000. Method 1000 includes processing a payment request (1001). Method 1000 includes determining if the payment was successful (1002). If the payment was not successful (NO at 1002), method 1000 includes displaying an error message (1003). If the payment was successful (YES at 1002), method 100 includes displaying a success message (1004) and saving one or more of: default payment instructions, shipping instructions, and an indication of payment completion in the database (1005).

When a transaction is successful, communications module 412 can send a message to the Payee indicating payment success and that the item is on the way. The message can be sent in real-time as delivery is possibly already in process. Communications module 412 can dynamically create the message. The message can include: Item ID (bill of laden/Waybill/tracking number), Item description, Sender name, Language selection (not shown to the Payee), Payees contact information, and Fees paid. Messages can be built from templates. Messages can include text and/or email messages as described depending on mobile number and email address availability. The message can be built from a template with the above dynamic information inserted into the header and content of the messages. Communications module 412 can implement a method similar to method 800 to send a payment success method.

When a transaction is successful, computer system 401 can save transaction information to database 421 and communications module 412 can send a message to the carrier that fees are paid. As such, a delivery person does not have to collect fees at the time of delivery. Communications module 412 can also provide information if the Payee agreed to have the package delivered without signature as well as any delivery instructions from the Payee. Communications module 412 can formulate a message in JSON, XML, email and any other electronic format. The message can be sent in real-time as delivery is possibly already in process. Communications module 412 can dynamically create the message. The message can include: Item ID (bill of laden/Waybill/tracking number), Item description, Sender name, Payee name, Total fees, Instructions if the package can be left without Payee being present at delivery (yes or no), and Package delivery instructions, if any or blank otherwise. The message can be built from a template with the above dynamic information inserted into the header and content of the messages.

Figure 11:
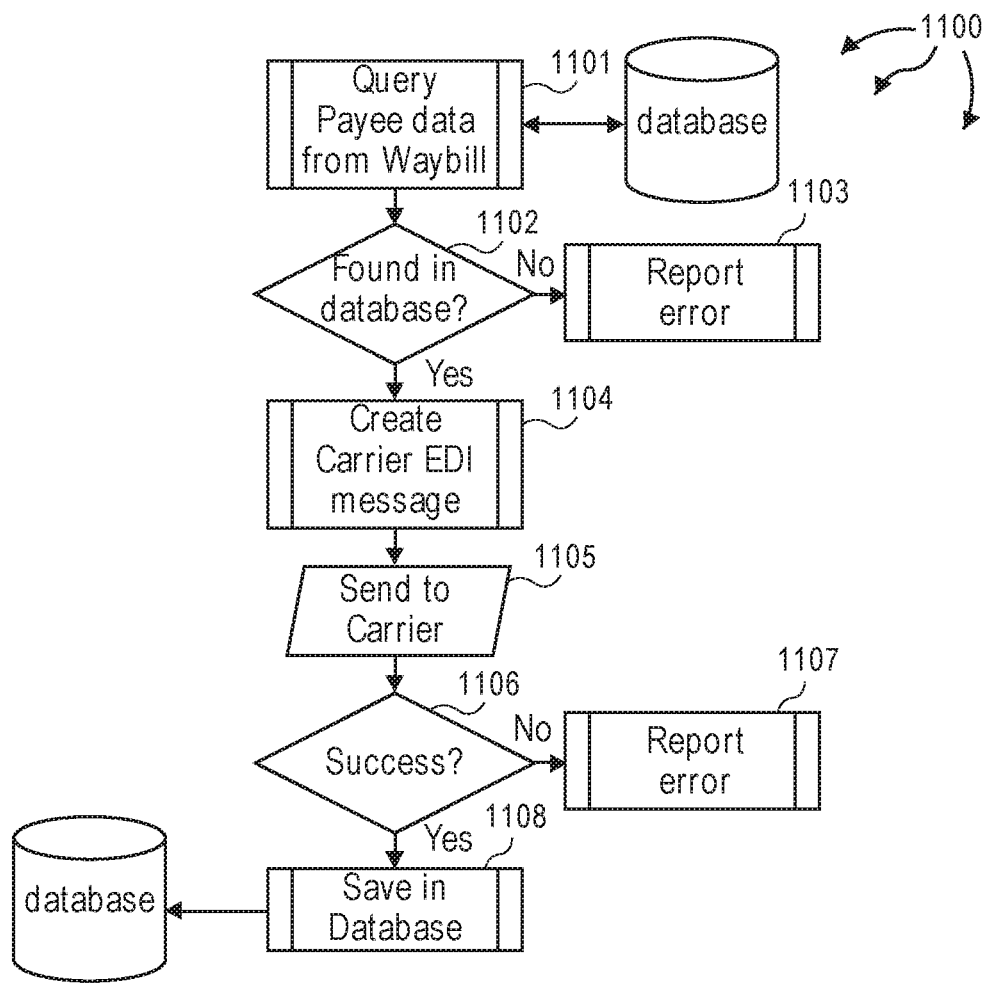
FIG. 11 illustrates a flow chart of an example method for sending a message to a carrier.

FIG. 11 illustrates a flow chart of an example method 1100 for sending a message to a carrier. Communications module 412 can implement method 1100. Method 1100 includes querying carrier data from the bill of laden/Waybill/tracking number (1101). Method 1100 includes determining if the carrier data was found in the database (1102). If the carrier data was not found in the database (NO at 1102), method 1100 includes reporting an error. If the carrier data was found in the database (YES at 1102), method 1100 includes creating a carrier EDI message (1104) and sending the carrier EDI message to the carrier (1105).

Method 1100 includes determining if sending the EDI message was successfully (1106). If sending the EDI message was successfully (YES at 1106), method 1100 includes saving the EDI message to the database (1108). If sending the EDI message unsuccessfully (NO at 1106), method 1100 includes reporting an error (1107).

When an item has been successfully delivered, the carrier can send a message to computer system 401. In response to an item delivered message, computer system 401 can close the transaction in database 421. Communications module 412 can receive the message. The message format can any of JSON, XML, email and any other electronic format.

If an item delivered message is not received in a specified amount of time after payment of fees, consolidation module 418 can follow up with an exception handling process. Some carriers subcontract out final delivery and never update their system past that checkpoint. As such, carriers do not always sent item delivered messages. Computer system 401 can assume an item was delivered at least as of the target date.

Figure 12:
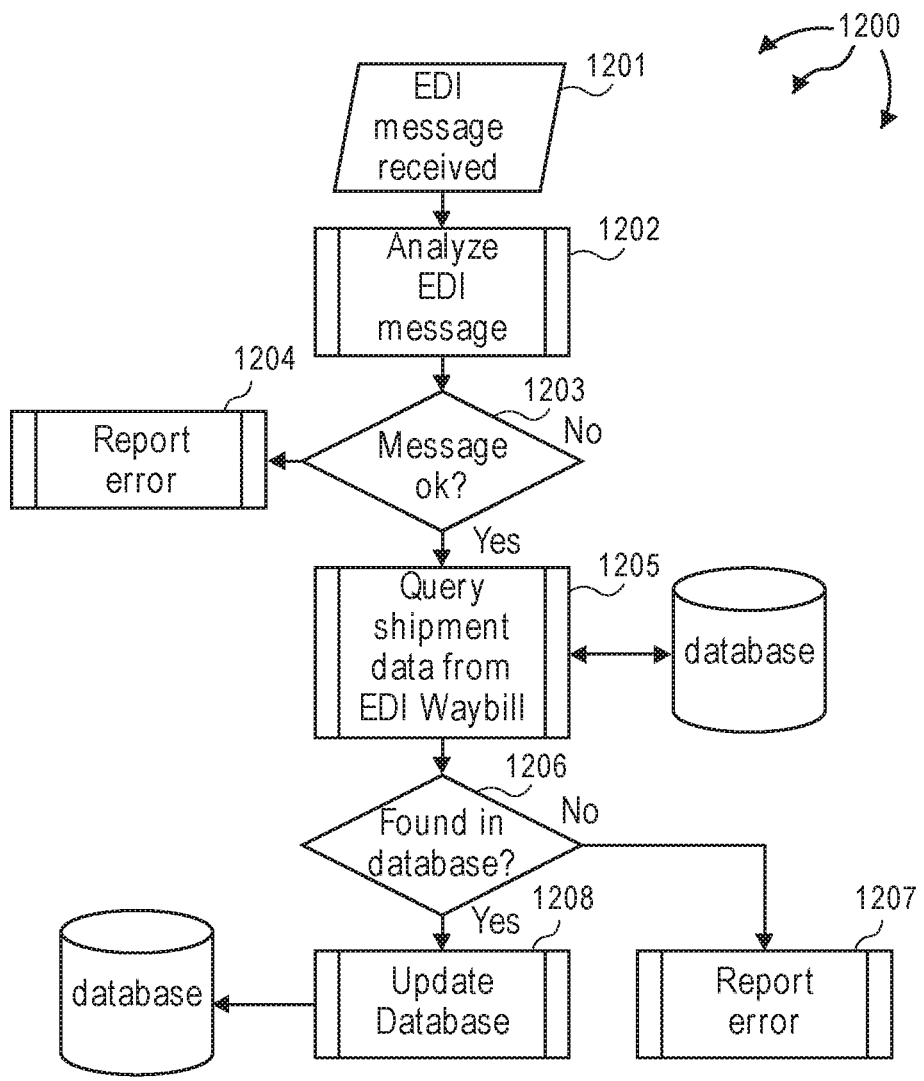
FIG. 12 illustrates a flow chart of an example method for processing an item delivered message.

FIG. 12 illustrates a flow chart of an example method 1200 for processing an item delivered message. Communications module 412 can implement method 1200. Method 1200 includes receiving an EDI message (1201) and analyzing the EDI message (1202). Method 1200 includes determining if the EDI message is ok (1203). If the EDI message is not ok (NO at 1203), method 1200 includes reporting an error (1204). If the EDI message is ok (YES at 1203), method 1200 includes querying shipment data from EDI bill of laden/waybill/tracking number (1205).

Method 1200 includes determining if the shipment data is found in the database (1206). If the shipment data is found in the database (YES at 1206), method 1200 includes updating the database (1208). If the shipment data is not found in the database (NO at 1206), method 1200 includes reporting an error.

Generally, database 421 can store information regarding an international shipment. Data in database 421 drives transactions workflows. Transaction workflows are asynchronous and any number of workflows can be implemented for any number of items concurrently. Transaction workflows can access data from database 421 as well as update and store new/additional data in database 421.

When a transaction is closed, information about the transaction can be copied to/from database 421 to data lake 422 (with personal information and sensitive information stripped out). Thus, data lake 422 contains data from transactions processed by computer system 401. Data lake 422 can be mined for insights, analytics, and data collections. Insights, analytics, and data collections can be provided to Carriers, brokers and customers. As such, data lake 422 can be leveraged for reflective, prospective, projective, descriptive, predictive, prescriptive and other analytics, patterns and strategic decisions.

In one aspect, database 421 and data lake 422 are of any SQL and NoSQL commercial or open source databases.

Consolidation module 418 can handle consolidation of received payments. Received payments can be consolidated per carrier. An electronic payment can be made to each carrier from collected fees. Electronic payments can be made periodically per carrier requirements, such as, for example, daily, weekly, monthly, quarterly or annually. Consolidation module 418 can also handle disputed transactions, for example if a Payee did not receive a delivery after paying fees. Consolidation module 418 can also handle missing transactions, for example, if a delivery person does not receive a clearing message in time or at all. Computer system 401 can implement industry standards, such as, for example, ANSI X12, for invoicing to/from carriers.

Company website 419 can be hosted by a commercial service provider. Company website 419 can include corporate content and a section for entering login credentials to gain access. Company website 419 can serve as a point of contact customers, Carriers, Payee, brokers, sender, receiver and partners where they can log into the website and review all previous transactions.

Accordingly, computer system 401 can implement methods 500-1200 to handle a delivery transaction for an internationally shipped item. Sender 402 can initiate a transaction 451 with carrier 403, for example, in response to a customer ordering an item online for shipment to an international destination. That is, the country of origin for the item differs from the destination country associated with customs 407. The item is attached to carrier 403 for shipping to recipient 404 in the destination country. Sender 402 can also send order information to computer system 401. The order information can be saved in database 421 and/or in data lake 422.

Carrier 403 sends bill of laden/waybill/tracking number 452 to broker 406 in the destination country. The bill of laden/waybill/tracking number contains pertinent international shipping information. Broker 406 can be part of carrier 403, associated with carrier 403, or can be an independent broker. The item is shipped internationally to recipient 404.

Broker 406 sends an EDI message 453 to customs 407 in the destination country with the pertinent international shipping information. Customs 407 clears the item. Depending on implementation, a clearing message 454 (including import fees due) can be sent to and from different parties. Customs 407 can send clearing message 454 to one or more of broker 406 and computer system 401. Broker 406 can forward clearing message 454 to one or more of carrier 403 and computer system 401. Carrier 403 can forward clearing message 454 to computer system 401. Computer system 401 can update database 421 and or data lake 422 with information from clearing message 454.

Computer system 401 can compose a payment request message 455 that includes a link to payment website 413. Computer system 401 can send the payment request to sender 402 (455*a*) or recipient 404 (455*b*). Computer system updates fee information in database 421. The payee (sender or recipient) receives payment request message 455 and clicks the link 456 to payment website 413. Payment website 413 can receive link 456*a* from sender 402 or link 456*b* from recipient 404. Payee fills in the payment information or uses a saved payment method that automatically populates the payment fields. Payee makes the Fee payment 457 on payment processor 408 through payment website 413. Payment processor 408 processes the payment and sends any messages 458 to computer system 401.

After payment, computer system 401 dynamically creates a payment completed message 459. Computer system 401 can send the payment completed message to sender 402 (459*a*) or recipient 404 (459*b*). Computer system can also update information in database 421 and/or data lake 422 with payment details.

For a DDP transaction, computer system 401 sends a payment completed message 460 to Broker and/or Custom. Computer system 401 updates information in database 421 and/or data lake 422 with payment details.

Computer system 401 sends a payment complete message 461 to carrier 403. Computer system 401 updates information in database 421 and/or data lake 422 with payment details.

Carrier 403 delivers 462 the item to the recipient. There may be significant calendar time between the Fee payment and the actual shipment delivery depending on the Carriers logistics ability and resources in the destination location. Carrier 403 sends a shipment complete message 413 to computer system 401 and optionally sends a shipment complete message 414 to sender 402. Computer system 401 updates information in database 421 and/or data lake 422 with item delivery details.

Computer system 401 reconciles the overall transaction and pays relevant entities. Payment can be performed can be done daily/weekly/monthly/quarterly depending on the agreement between computer system 401 and the relevant entities.

In some aspects, modules in computer architecture 200 include and/or interoperate with modules in computer architecture 400 or vice versa.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can transform information between different formats, such as, for example, shipping information, customs fees, import fee amounts due, import fees paid, payment links, delivery instruction links, delivery instructions, payment notifications, delivery notifications, sender information, recipient information, carrier information, payment received messages, payment indicators, etc.

System memory can be coupled to the one or more processors and can store instructions (e.g., computer-readable instructions, computer-executable instructions, etc.) executed by the one or more processors. The system memory can also be configured to store any of a plurality of other types of data generated by the described components, such as, for example, shipping information, customs fees, import fee amounts due, import fees paid, payment links, delivery instruction links, delivery instructions, payment notifications, delivery notifications, sender information, recipient information, carrier information, payment received messages, payment indicators, etc.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general-purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash or other vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications, variations, and combinations are possible in light of the above teaching. Further, it should be noted that any or all of the aforementioned alternate implementations may be used in any combination desired to form additional hybrid implementations of the disclosure.

The invention claimed is:

1. A computer system comprising:
   a processor;
   system memory coupled to the processor and storing instructions configured to cause the processor to:
     electronically receive shipping information in a first data format indicating that an internationally shipped item is to enter a country under control of a carrier destined for delivery to an intended recipient at a physical location in the country;
     automatically, in response to electronically receiving the shipping information, add the shipping information to a database, including:
       create a unifying database entry in the database and including one or more import fee fields, one or more carrier fields, one or more recipient fields, one or more payment fields, and one or more delivery instruction fields;
       convert the shipping information from the first data format into a unified database format;
       store data from the received shipping information into the unifying database entry in the one or more carrier fields and the one or more recipient fields; and
       set a payment indicator in the one or more payment fields to indicate that import fees for the internationally shipped package are unpaid;
     electronically monitor an electronic customs feed in a second data format, the second data format differing from the first data format;
     automatically, update the database, including:
       identify an import fees amount due corresponding to the internationally shipped item in an electronic customs feed, the import fees due indicated in a currency of the country;
       convert the import fees amount due from the second data format into the unified database format; and
       store data from the import fees amount due into the unifying database entry in the one or more import fees field;
     automatically, update the database indicating payment of the import fees due amount, including:
       access the import fees amount due from the one or more import fee fields;

electronically send an indication of the import fees due amount along with an electronic payment link to an entity responsible for paying the import fees amount due;

electronically receive an indication import fee payment;

transition the payment indicator in the one or more payment fields to indicate that import fees are paid;

formulate a payment notification responsive to detecting the transitioned payment indicator;

convert the payment notification into the first data format; and electronically send the payment notification to the carrier; and automatically in response to detecting the transitioned payment indicator, handle delivery of the internationally shipped item, including:

electronically send a data entry link to an electronic identifier corresponding to the intended recipient;

electronically receive delivery instructions directly into the one or more delivery instruction fields in the unified database format via the data entry link;

access the delivery instructions from the one more delivery instruction fields;

convert the delivery instructions from the unified data format into the first data format;

electronically send the delivery instructions to the carrier;

electronically receive a delivery notification that the internationally shipped item was delivered in accordance with the delivery instructions; and update the one or more recipient fields in the unifying database entry indicating delivery of the internationally shipped item.

2. The computer system of claim 1, wherein instructions configured to cause the processor to electronically monitor an electronic customs feed in a second data format comprise instructions configured to cause the processor to electronically monitor an electronic customs feed in an Electronic Data Interchange (EDI) interface format; and wherein instructions configured to cause the processor to electronically receive shipping information in a first data format comprise instructions configured to cause the processor to electronically receive shipping information in a data format differing from the Electronic Data Interchange (EDI) interface format.

3. The computer system of claim 1, wherein instructions configured to cause the processor to electronically send an indication of the import fees due amount along with an electronic payment link comprise instructions configured to cause the processor to electronically send an indication of the import fees due amount along with an electronic payment link to an item shipper.

4. The computer system of claim 1, wherein instructions configured to cause the processor to electronically send an indication of the import fees due amount along with an electronic payment link comprise instructions configured to cause the processor to electronically send an indication of the import fees due amount along with an electronic payment link to an item intended recipient.

5. The computer system of claim 4, wherein instructions configured to cause the processor to electronically send an indication of the import fees due amount along with an electronic payment link to an item intended recipient comprise instructions configured to cause the processor to electronically send one or more of a text message or an email message to an electronic device associated with the item intended recipient.

6. The computer system of claim 1, wherein instructions configured to cause the processor to identify an import fees amount due corresponding to the internationally shipped item comprise instructions configured to cause the processor to identify one or more of: a duty, tax or a Value Added Tax (VAT).

7. The computer system of claim 1, wherein instructions configured to cause the processor to electronically receive delivery instructions directly into the one or more delivery instruction fields comprise instructions configured to cause the processor to electronically receive authorization to deliver the item without a signature.

* * * * *